US007069259B2

(12) United States Patent
Horvitz et al.

(10) Patent No.: US 7,069,259 B2
(45) Date of Patent: Jun. 27, 2006

(54) MULTI-ATTRIBUTE SPECIFICATION OF PREFERENCES ABOUT PEOPLE, PRIORITIES AND PRIVACY FOR GUIDING MESSAGING AND COMMUNICATIONS

(75) Inventors: Eric J. Horvitz, Kirkland, WA (US); Carl M. Kadie, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 709 days.

(21) Appl. No.: 10/184,845

(22) Filed: Jun. 28, 2002

(65) Prior Publication Data

US 2004/0002932 A1    Jan. 1, 2004

(51) Int. Cl.
G06F 15/18    (2006.01)
G06N 3/08    (2006.01)

(52) U.S. Cl. .............................. 706/25; 706/15; 706/16

(58) Field of Classification Search ................. 706/25, 706/15, 16; 348/461; 709/206
See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,812,865 A | 9/1998 | Theimer et al. | |
| 6,134,566 A | 10/2000 | Berman et al. | |
| 6,134,582 A | 10/2000 | Kennedy | |
| 6,370,526 B1 | 4/2002 | Agrawal et al. | |
| 6,421,694 B1 | 7/2002 | Nawaz et al. | |
| 6,457,879 B1 | 10/2002 | Thurlow et al. | |
| 6,466,232 B1 | 10/2002 | Newell et al. | |
| 6,466,969 B1 * | 10/2002 | Bunney et al. ............. 709/206 |
| 6,513,046 B1 | 1/2003 | Abbott, III et al. | |
| 6,549,915 B1 | 4/2003 | Abbott, III et al. | |
| 6,747,675 B1 | 6/2004 | Abbott et al. | |
| 6,791,580 B1 | 9/2004 | Abbott et al. | |
| 6,801,223 B1 | 10/2004 | Abbott et al. | |
| 6,812,937 B1 | 11/2004 | Abbott et al. | |
| 6,842,877 B1 | 1/2005 | Robarts et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0044152 A1 | 4/2002 | Abbott, III et al. | |

(Continued)

OTHER PUBLICATIONS

Luis Felipe Cabrera et al, Herald: Achieving a Global Event Notification Service, 2001, IEEE, 0-7695-1040-X/01, 87-92.*

(Continued)

*Primary Examiner*—Joseph P. Hirl
(74) *Attorney, Agent, or Firm*—Amin & Turocy, LLP

(57) ABSTRACT

The present invention relates to a system and methodology to facilitate multiattribute adjustments and control associated with messages and other communications and informational items that are directed to a user via automated systems. An interface, specification language, and controls are provided for defining a plurality of variously configured groups that may attempt to communicate respective items. Controls include the specification of priorities and preferences as well as the modification of priorities and preferences that have been learned from training sets via machine learning methods. The system provides both a means for assessing parameters used in the control of messaging and communications and for the inspection and modification of parameters that have been learned autonomously.

90 Claims, 16 Drawing Sheets

U.S. PATENT DOCUMENTS

| | | |
|---|---|---|
| 2002/0052930 A1 | 5/2002 | Abbott et al. |
| 2002/0052963 A1 | 5/2002 | Abbott et al. |
| 2002/0054130 A1 | 5/2002 | Abbott, III et al. |
| 2002/0054174 A1 | 5/2002 | Abbott et al. |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0083025 A1 | 6/2002 | Robarts et al. |
| 2002/0083158 A1 | 6/2002 | Abbott et al. |
| 2002/0087525 A1 | 7/2002 | Abbott et al. |
| 2002/0099817 A1 | 7/2002 | Abbott et al. |
| 2003/0046401 A1 | 3/2003 | Abbott et al. |
| 2003/0067554 A1* | 4/2003 | Klarfeld et al. ............. 348/461 |
| 2003/0154476 A1 | 8/2003 | Abbott, III et al. |
| 2004/0002958 A1* | 1/2004 | Seshadri et al. ............... 707/3 |
| 2004/0002972 A1* | 1/2004 | Pather et al. ................... 707/6 |
| 2004/0002988 A1* | 1/2004 | Seshadri et al. ............ 707/102 |
| 2004/0030741 A1* | 2/2004 | Wolton et al. .............. 709/202 |
| 2005/0034078 A1 | 2/2005 | Abbott et al. |

OTHER PUBLICATIONS

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36-No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May, 1998, 48 pages.

Mark Weiser, The Computer for the 21st Century, Scientific American, Sep. 1991, pp. 94-104, vol. 265—No. 3.

* cited by examiner

MULTI-ATTRIBUTE SPECIFICATION OF PREFERENCES ABOUT PEOPLE, PRIORITIES AND PRIVACY FOR GUIDING MESSAGING AND COMMUNICATIONS

TECHNICAL FIELD

The present invention relates generally to computer systems, and more particularly to a system and method to augment/adjust automated learning components via a language tool that facilitates specification of user preferences relating to multiple attributes of people, priorities, and privacy for guiding communications to a user.

BACKGROUND OF THE INVENTION

Advanced technology computer and communication systems have transformed many important aspects of human and computer interactions. This is apparent when considering how technology has changed electronic communications such as message transmission and retrieval. In the not too distant past, voice answering machines provided one particular way for a person to electronically capture a message and forward it to another. With technology advancements such as wireless and Internet systems however, electronic messaging systems have become much more sophisticated. These systems may include e-mail, voice mail, pager and cell phone technologies, for example, wherein almost an infinite supply of information may be sent and retrieved in a concurrent manner. Due to the content and volume of information available, and the ever increasing number of modalities for communicating such information, other systems have been developed to manage, direct and control message exchanges between parties and/or systems.

In some cases, methods from decision science and artificial intelligence, as well as other techniques have been employed to manage and direct electronic information transfers such as when and how to notify/alert a message recipient. As a general example, this may include considerations regarding the message recipient's location, what type of device (e.g., cell phone, pager, e-mail) the recipient has access to and when a particular message is transmitted. These and other considerations can enable intelligent systems to prioritize a plurality of messages directed at a particular message recipient, direct messages to a particular location and/or communication modality associated with the recipient, as well as consider whether the value of information contained within a message exceeds the cost of disrupting the recipient presently or in the future. For example, one particular message recipient may desire to receive emergency messages immediately at any time of the day, important business messages during working hours, and not receive some messages at all such as "Spam" e-mail or other unwanted solicitations. As can be expected, desires of message recipients regarding message notification and priorities can differ greatly from one recipient to another.

In order to provide these and other notification capabilities, intelligent systems generally consider and operate upon a large number of decision-making parameters concerning multiple aspects of the message recipient's circumstances/ desires when managing and directing message traffic to a particular recipient. These parameters enable the intelligent system to determine and make decisions regarding a particular recipient's notification desires and distinguish the notification requirements from one recipient to another. In other words, each recipient has different priorities, desires and needs that influence decision-making processes and notifications flowing from the intelligent system. Consequently, in order to satisfy a variety of notification requirements applying to a plurality of different circumstances and recipients, many automated decision-making processes are provided to tailor notification requirements according to a particular user's needs.

Often, along with the large number of parameters and processes that influence these systems, there is a complex and/or competing relationship between the decision-making parameters, however. For example, one parameter or combination of parameters may subtly or overtly influence decisions relating to other parameters or combinations thereof. Since the number of parameters involved in the decision-making process can be extensive and/or interrelated, it may be challenging for a user to personalize the decision-making process to meet specific requirements relating to that user's circumstances and desires.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to facilitate guiding communications in conjunction with automated systems and in accordance with user preferences that can adjust, tune, and/or equalize such systems. A plurality of attributes can be associated with an item such as e-mail or other type message that affects how and when a respective item is delivered or presented to a user. Feedback can be employed that offers clues as to the automated decision-making processes being employed when directing the items to the user, wherein the clues can indicate a weight or value that has been automatically assigned to a respective attribute. Ergonomic and adjustable controls are provided that facilitate modification of the weights or values while mitigating more complex processes such as requiring users to formulate and enter rules. Furthermore, a plurality of relationships or groupings can be established and defined by the user such as organizational relationships, dynamic relationships, static relationships, trust relationships and/or temporal relationships that further qualify how and when the items are delivered to the user.

According to one aspect of the present invention, a user preference identification tool and accompanying user interface is employed with machine learning and automated reasoning technologies that focus on content, context aware messaging and event notification. The tool provides capability to access and encode dynamic groupings of people and/or aliases based on non-organizational structural similarities such as history, recent/past activities, schedule, privacy desires, authorizations, personal attributes, and/or other distinct relationships between people, and facilitates the ability to find easy-to-understand relationships between people among traditional organizational structures.

The user preference and identification tool manages key concepts surrounding the definition of people, groups, and preferences for guiding notifications, communications, and privacy. A name MAP* has been derived from one or more tool capabilities relating to *Multiattribute specification of Preferences (MAP) about People, Priorities, and Privacy* (*)—thus MAP*. MAP* can be employed with systems that are focused on automated reasoning and machine learning to guide message routing and information access in a content- and context-sensitive manner. The tool enables users to assess and encode preferences and to provide additional user interface for guiding portions of the automated machinery.

MAP* supports interfaces and tools for defining groups and modifying priorities and preferences being manipulated therein. It also facilitates probing the details of an automated assignment of urgencies that is performed by automated systems. An important concept of MAP*, highlighted in the tool, is the ability to quickly formulate different groupings of people and aliases. Beyond being able to create static groups, creation of dynamic groups can be achieved, based on activities, history, schedule, and organization, for example, and enabling users to specify, select and/or adjust policies associated with the creation of such dynamic groups. In another aspect, MAP* supports interfaces to define, explore, and/or refine priorities associated with different messages, typically encoded as urgencies that are assigned to different forms of communication based on a source, sender, recipient(s), and information content of messages. The urgencies can be manipulated as scalar values or numbers, and/or simpler, more qualitative controls, representations and visualizations of the respective values can be provided. For example, rather than employing numbers, expressions such as normal and high urgency or low, normal, and high priority, can be provided, for example.

Moreover, MAP* enables users to define/select privacy and authorization policies for different realms of life (e.g., home, work, financial arenas) that determine how, when and if a message item is ultimately received by the user. This can include assignment of scalar authorization values to groups of people—and the definition of thresholds for different kinds of information access. In addition, optional considerations of confirmation can be provided by the owner/user that is executed selectively, depending on an authorization level.

It is to be appreciated that although various automated systems and process are provided by the present invention, manual configurations and/or adaptations can be provided as well. For example, systems can also be configured or adapted in an entirely (or partially) manual mode. In a manual mode, for example, the user can create attributes based on people, words, phrases, and information about the sender and recipients of a message, that appear to be important to the user and then increase or decrease a score of an associated email or other item based on those attributes. The systems and methods of the present invention allows for the review of attributes, weightings associated with attributes, and preferences learned via machine learning, and thus, enables a user to inspect and modify the results, thereby effectively coupling people and machine learning, in a mixed-initiative manner, to yield an overall better control of and experience with automation.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology to facilitate multi-attribute adjustments and control associated with communications items that are directed to a user via automated learning systems (e.g., items such as e-mails, voice messages, pager notifications, web service notifications, and so forth). An interface, specification language, and controls are provided for defining a plurality of variously configured groups that may attempt to communicate respective items. Controls include modifying priorities and preferences that are operated upon and determined by the automated learning systems, wherein the controls can cooperate with associated user feedback providing details of the automated assignment of urgencies or priorities.

Figure 1:
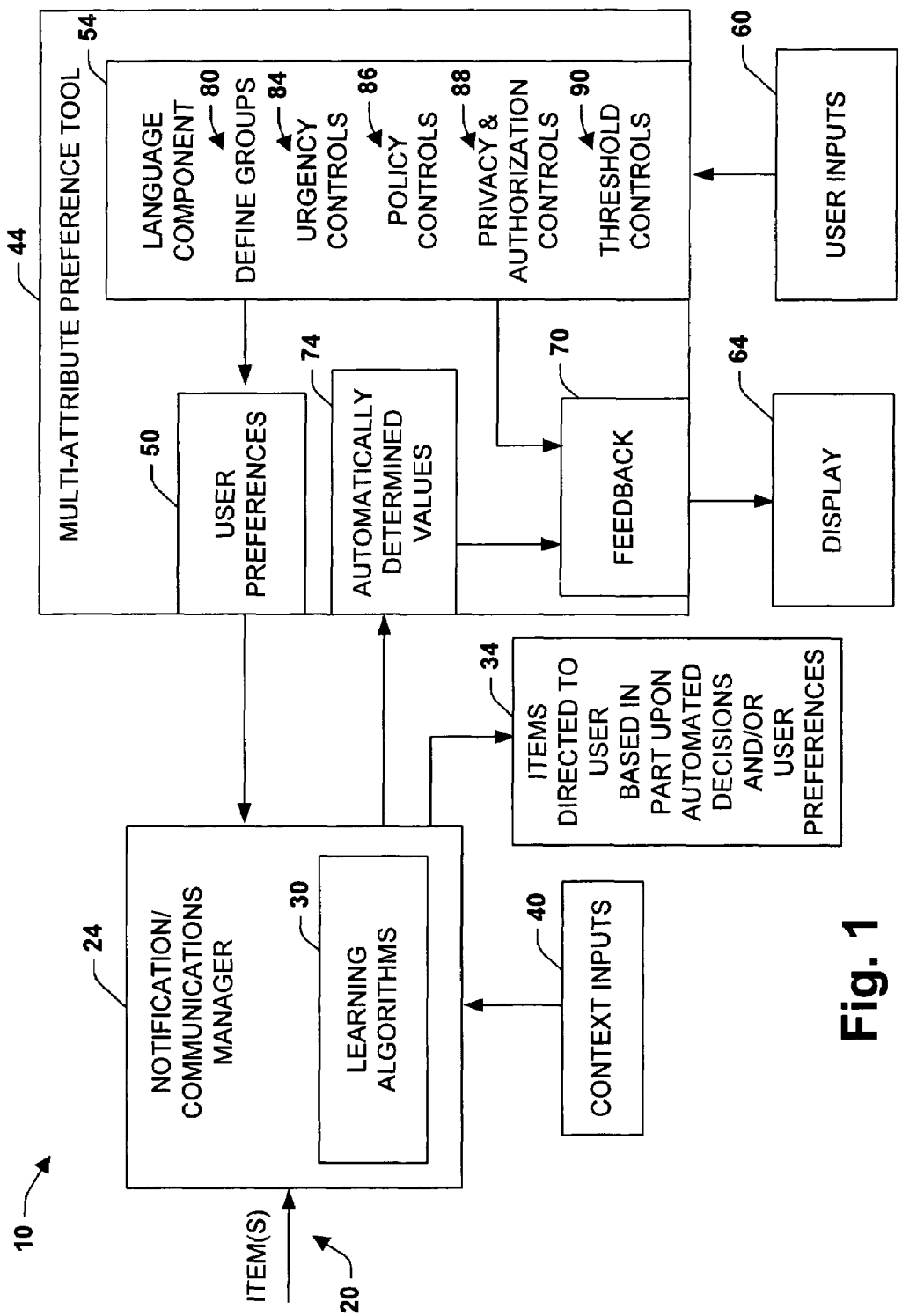
FIG. 1 is a schematic block diagram illustrating a communications architecture and adjustment process in a distributed computing environment in accordance with an aspect of the present invention.

Referring initially to FIG. 1, a system 10 illustrates an automated communications architecture in a distributed computing environment in accordance with an aspect of the present invention. One or more items 20 are received by a notification manager 24 (or communications manager) and processed by learning algorithms 30 to automatically direct the items to a user at 34. The items 20 can include substantially any type of message or notification such as voice messages, web information, e-mails, pager information, and so forth. The learning algorithms 30 analyze one or more attributes (described/illustrated below) of a respective item 20 to automatically determine such characteristics as an urgency or priority of the item to the user. For example, the learning algorithms 30 can include employment of classifiers that are configured to analyze associated attributes of the items 20, wherein a feature vector assigns a weight or value to the attribute based upon learning processes applied to training members or data of the attribute's class or topic. Classifiers can be stated as a function that maps an input attribute to the confidence that the input belongs to a class and can include such techniques as Support Vector Machines (SVM), Naive Bayes models, Bayes networks, decision trees, similarity-based, vector-based, and/or other learning models or combinations thereof. It is to be appreciated that other decision-theoretic analysis can also be employed in conjunction with the learning algorithms 30 to determine when, where, and/or if to direct notification of the received items 20 to the user at 34. For example, the notification manager 24 can analyze one or more context inputs 40 to determine a user's present context state, and direct the items 20 in accordance with the determined urgency of the item and the user's current context. Such inputs can include evidence of keyboard activities, mouse movements, microphone inputs, camera inputs and substantially any indication of the user's activity such as time and electronic calendar information relating to the user's activity. The notification manager 24 processes the context inputs 40 to determine or infer such aspects or context as how focused the user is, how busy the user is, what are the user's goals, and whether or not the user desires to be interrupted with a notification of the item in the present, at some time in the future, or not at all.

A multiattribute preference (MAP) tool 44 is provided to influence automated decision-making processes in the notification manager 24 and according to one or more user preferences 50 (e.g., XML blob or file indicating desired settings or adjustments). The user preferences 50 are derived from a language component 54 that processes user inputs 60 to control, adjust, tune and/or determine the user preferences 50 that can potentially alter decision processes in the notification manger 24. The language component 54 can be operated and presented in substantially any form such as in a related set of graphical user interfaces (GUI) that interact with a display 64.

The display 64 can include one or more display objects (not shown) that can include such aspects as configurable icons, buttons, sliders, input boxes, selection options, menus, tabs and so forth having multiple configurable dimensions, shapes, colors, text, data and sounds to facilitate operations with the system 10. In addition, the user inputs 60 can also include a plurality of other inputs or controls for adjusting and configuring one or more aspects of the present invention. This can include receiving user commands from a mouse, keyboard, speech input, web site, browser, remote web service and/or other device such as a microphone, camera or video input to affect or modify operations of the MAP* tool 44 and/or language component 54.

In addition, the display 64 can be driven from a feedback component 70 that receives automatically determined values at 74 representing weights that have been assigned to associated items 20 and related attributes via the learning algorithms 30. The automatically determined values 74 provide indications or clues as to the more complicated processes affecting delivery of the items 20 to the user at 34. Based upon an analysis of the feedback 70, the user can employ the language component 54 to control, alter, adjust, tune, and/or personalize the automated processes within the notification manager 24 to desired notification performance (e.g., adjust how often or when items are delivered, modify who the items may be received from, alter what security measures should be adopted before receiving an item, adjust urgency thresholds and/or policies for receiving items).

The language component 54 facilitates a plurality of definitions, selections, and controls that provide indications of desired user preferences 50. For example, various group definitions can be provided at 80, urgency/priority controls at 82, policy controls at 86, privacy/authorization controls at 88, and threshold controls at 90. Group definitions at 80 can include static groups to enable users to build—and label for manipulation per specification of notification/communication policies—groups, in addition to groups defining groups of people (or macro groups of groups). Beyond defining and labeling groups of people, the language component 54 enables specifying groups by distance and relationships between a user and other users. For example, users can define groups by easy-to-understand relationships in an organizational chart. To illustrate this aspect, users can specify people within an organization with such concepts as my peers, organizational peers including people in other groups, up (or down) the org chart from me, up (or down) the org chart from me for n levels, n being an integer. The notification manager 24 can provide such constructs when learning about the urgencies of items/communications via analysis of sender and recipient fields, for example, and/or other attributes of an item 20.

The groups 80 can also include dynamic groups enabling users to define policies for building groups such as those defined by communications, such as groupings by communication history. These include distinctions such as people with whom I have communicated with over the least n weeks, people with whom I've initiated a communication with, people who I communicate with frequently (where frequently is defined by the user), and so forth. Dynamic groups can also specify such groups by types of communication, (e.g., people with whom I initiated a call by telephone (or other modality) over the last n weeks). Such distinctions can be defined by analyzing a database of communication interactions, for example.

Another class of dynamic groups is based on meeting histories or futures and can be referred to as groupings by meetings and appointments. These distinctions can be harvested from online appointment books, for example. Such groups can include temporal distinctions or relationships such as people who I will be meeting with in the future, people who I will be meeting with soon (e.g., within the coming week), people with whom I met recently (e.g., within the last n weeks), people who I will be meeting with today, and so forth. They also include joins (e.g., Boolean combinations) among these types of groups, (e.g., such disjunctions as people who I have met with in the previous month or those people I will meet with in the coming week).

Yet another type of group 80 can be defined as a grouping by active project. For example, policies can be defined for inclusion of people within groups by dynamic associations and interactions. Thus, users can define "projects," (or other category) from a group of prototypical types of projects or activities, such as collaborating on a document, and includes defining groups of people with such definitions as, people who have edited a shared document within x days (or other time), x being an integer. Groupings by active project can lead to useful sets or subsets of distinctions for guiding notifications and communications within the notification manager 24.

The language component 54 enables users to assign or adjust scalar urgency values to messages at 84, and can include defining how different people (e.g., senders and recipients) and/or components/attributes of the informational content of messages or items influence (contribute or diminish) the urgency or priority value assigned to messages at 74. For example, a "what-if" mode can be provided to enable users to explore a summary analysis of priority values for a selected set of urgency settings. In another aspect, a message browser (not shown) can be provided that automatically identify values of important or selected attributes of messages and then assigns values to the messages. Such a browser (can cooperate with the feedback 70) facilitates an inspection of how urgencies are assigned for the sake of having a deeper understanding and for iterating and/or refining automated urgency assignments.

The policy controls 86 can be employed to influence straightforward and more sophisticated decision-theoretic policies for routing, alerting, and communication within the notification manager 24. The language component 54 provides tools/interfaces that enable users to manipulate an abstraction of more sophisticated policies to simpler statements about preferences relating to alerting based on a priority score or value associated with an item/attribute. In one aspect, referred to as Basic Policy (illustrated below), an alerting process centers on a concept referred to as "bounded deferral." Bounded deferral refers to preferences about bounds (settable by user) on how long to wait in order to find a suitable time to alert someone about an information item or message. Bounds and policies can be defined/controlled by the policy controls 86 based on context and/or on the determined priority score or value associated with an item or attribute. In another aspect, the policy controls 86 enable users to specify curves that can be reasoned about in a decision-theoretic manner by the notification manager 24.

The privacy and authorization controls 88 enable users to assess/control preferences about thresholds of authorization for different groups of people and/or for different dimensions of life, and can include a specification of requirements to have third-parties confirm a desire to access information with the user. The threshold controls 90 can be employed in conjunction with the privacy and authorization controls 88 and/or can be employed with other adjustable aspects that are described in more detail below.

Figure 2:
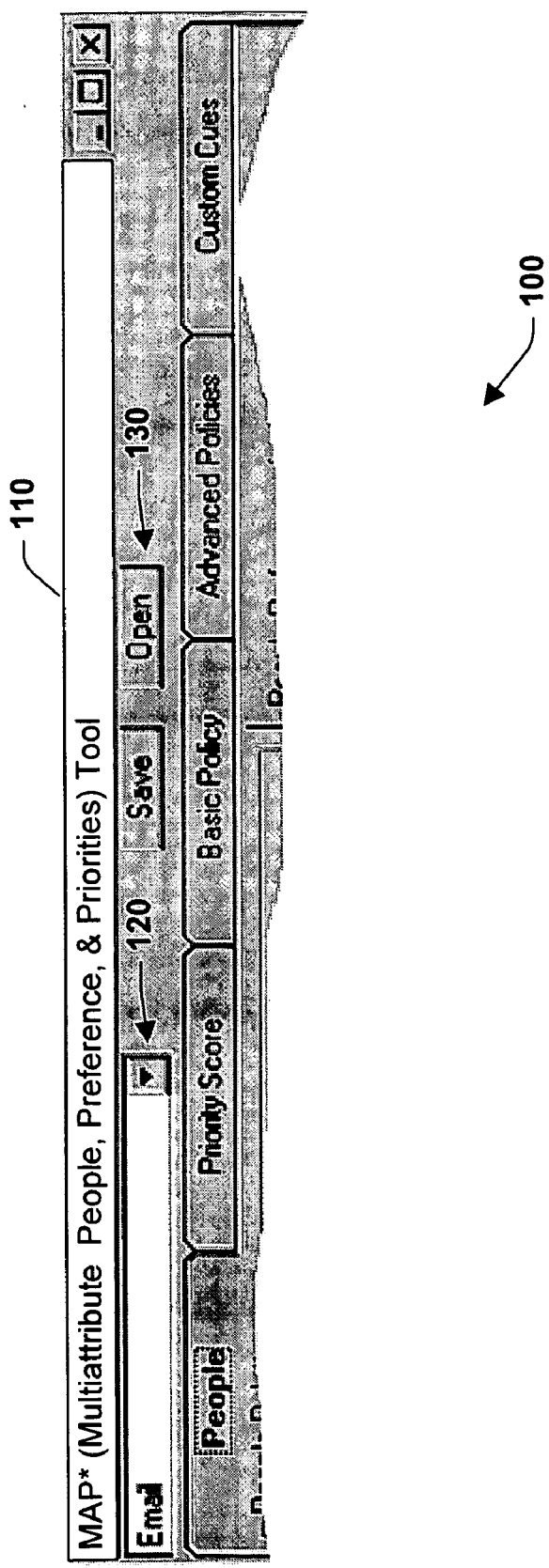
FIG. 2 is a diagram illustrating tool selection options in accordance with an aspect of the present invention.

FIG. 2 is a diagram illustrating tool selection options in accordance with an aspect of the present invention. A cut-away section 100 illustrates a portion of a multiattribute people, preference and priorities (MAP) tool 110 (also referred to as tool). The tool 110 can include a "Source Selection" at 110 and "Open/Save Buttons" at 130. The source selection 110 provides a plurality of options to select the source of an item(s) of interest (e.g., e-mail, instant messenger, voice mail, pager, PDA, and so forth), whereby the tool 110 adjusts display options and controls in accordance with the selected source. Pseudo-sources such as "Trust—Work Related" can also be provided and are described below. The Save and Open Buttons 130 save a state of the MAP tool application (e.g., state of user settings associated with various GUI interfaces) into an XML file or other type file. A sample file, referred to as sample.xmp file (not shown), can be provided to record/restore default/previous settings and can be opened to restore previous options set by the user via the tool 110. It is noted that for the purposes of explanation, that FIGS. 2–9 illustrate possible examples from an e-mail source. As noted above, other source types for items or messages can be employed, wherein it can be appreciated that one or more of the various options and displays depicted for the e-mail source may be provided differently in accordance with different characteristics of the associated source (e.g., beyond words and phrases spotted in utterances via full recognition, or simpler word and phrase spotting, a voice encoded message may indicate attributes of prosady noted in an acoustical, phonemic analysis of inflection, loudness, urgency ("I must speak to you now, it is an emergency," and so forth)). Prosadic attributes include such audio cues identified in a voice encoding of a message, including the detected rate of speech, speech energy, average pitch level, pitch variation, including right- and left-edge analyses of utterances, which capture the phonemic structure of the onset and end of uterrances, capturing, for example a question being asked in a voice message.

Figure 3:
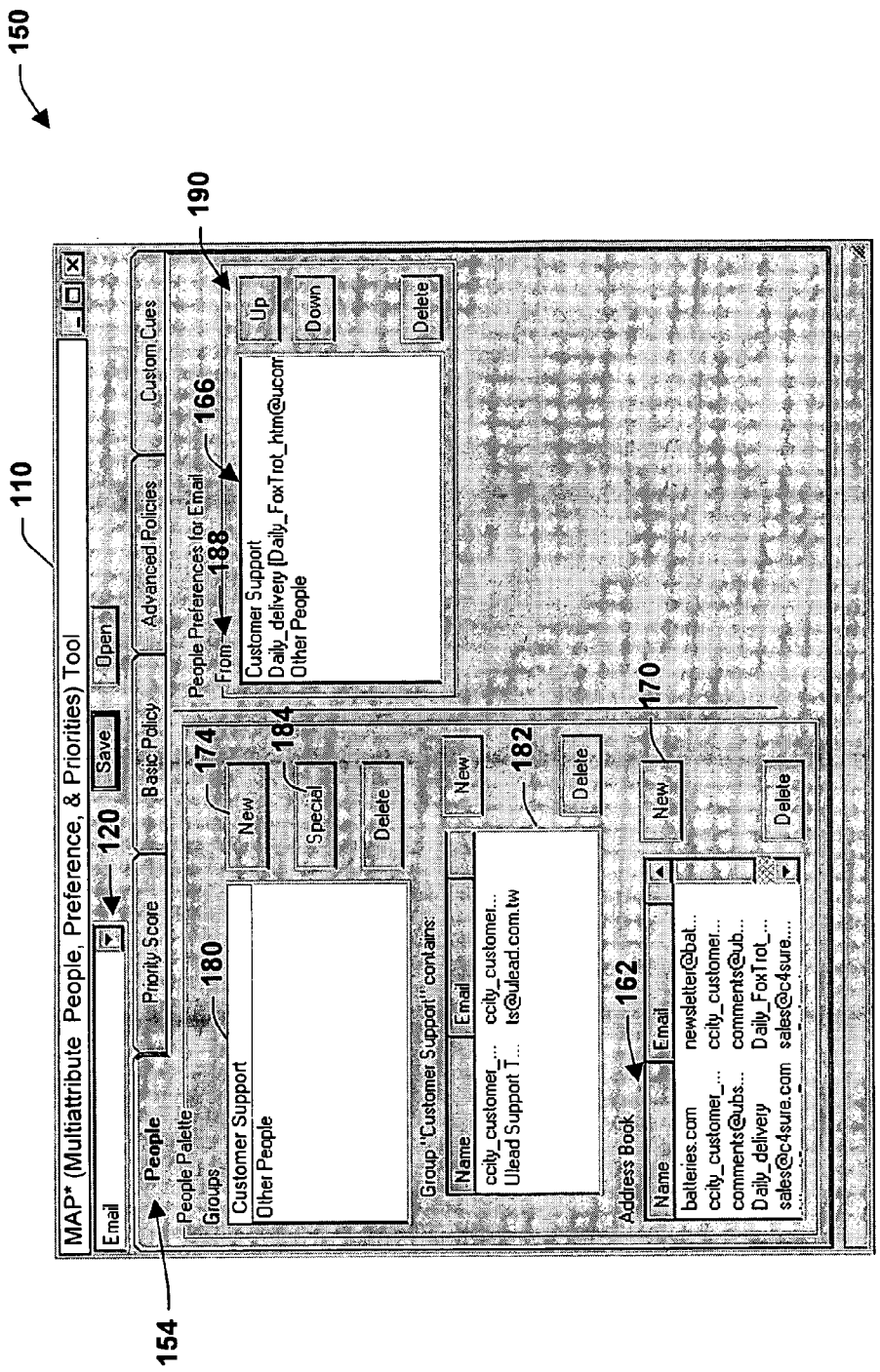
FIG. 3 is a diagram illustrating group options in accordance with an aspect of the present invention.

FIG. 3 is a diagram 150 illustrating group options in accordance with an aspect of the present invention. A People Tab 154 can be selected and provide various display segments/options. A People Palette 158 can be displayed with an address book 162 that is shared by all or a subset of sources 120. At 166, users can specify which people and groups are of interest for the currently selected source 120. In the address book section 152 of the People Palette 158, users store a name and e-mail address of people/sources of interest (or other type information such as a cell phone or pager number). Users can add new entries in the address book 162 by utilizing a "New" button 170. Alternatively, some address books may be employed with standard e-mail or calendar services that support copy/paste and drop/drag functionality. Thus, users can copy or drag addresses from other electronic address books/locations and place the addresses into the address book at 162.

To name or identify a new group a "New" button 174 can be selected next to the a Groups list at 180. Under the Groups list 180 is a listing of the members of the currently selected group (e.g., Customer Support). Users can drag people/addresses from the address book 162 to a list of group members at 182. A special button 184 next on the Groups list 180 enables users to add dynamic/other type groups to the group list 180.

At 166, a list is provided for "People Preferences For <the Current Source>." Attributes in the current source 120 that relates to people are listed at 166. For example, for e-mail, a "From" attribute 188 is displayed, wherein users decide what values the listed attribute can have. This can be achieved by dragging groups or people from the People Palette 154 to the attribute of interest. In the e-mail example above, for example, the "From" attribute 188 can have values: "Customer Support", a group; "Daily Delivery", a person; or "Other People." "Other People" can be defined as a special group that cannot be deleted. It is to be appreciated that other values can similarly be provided. Up and down buttons at 192 can be provided to select other attributes and direct back to previously displayed attributes.

Figure 4:
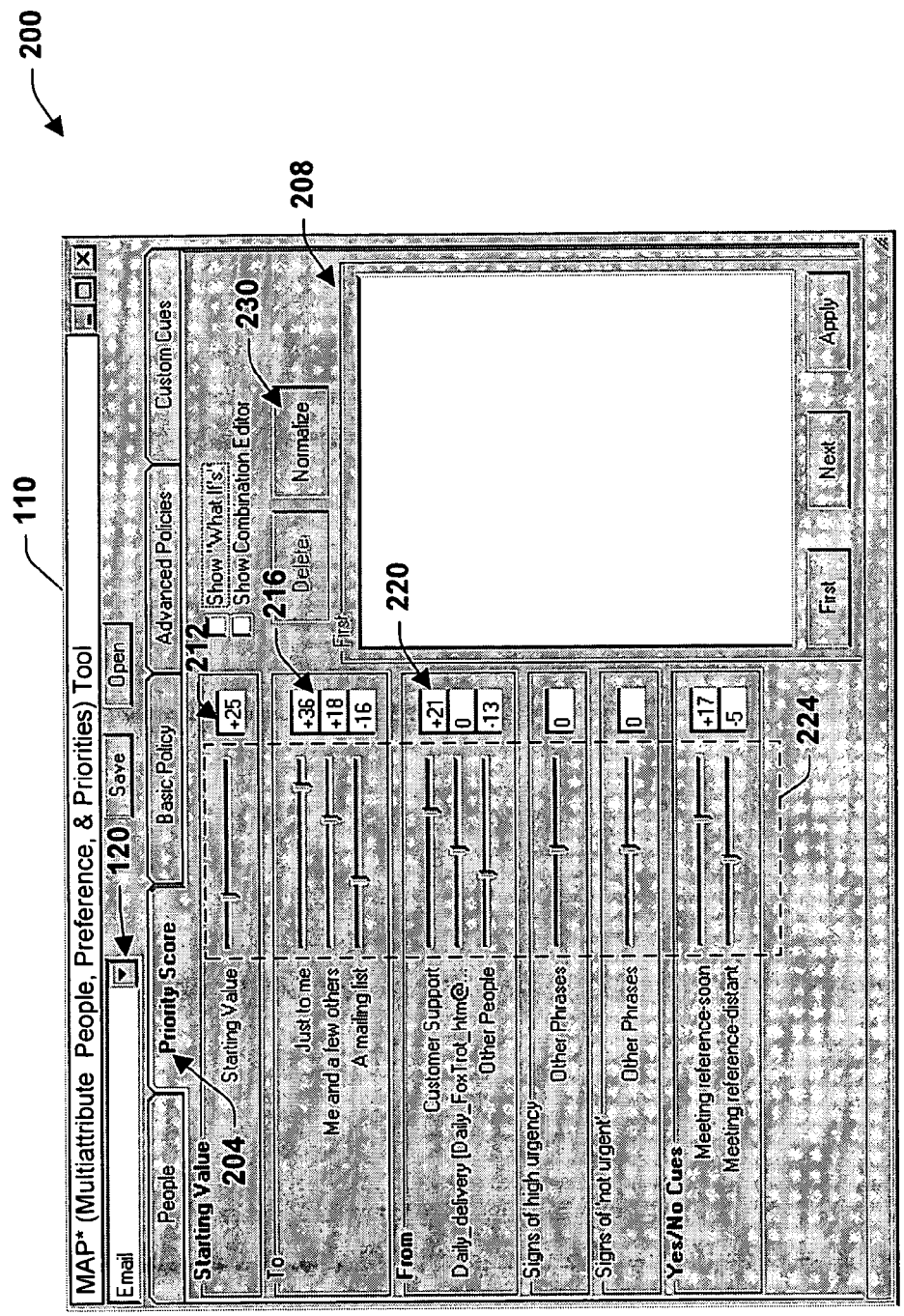
FIG. 4 is a diagram illustrating priority feedback and controls in accordance with an aspect of the present invention.

FIG. 4 is a diagram 200 illustrating priority feedback and controls in accordance with an aspect of the present invention. It is noted that the following numeric examples are exemplary in nature and can be provided/adjusted in a plurality of combinations, values, and/or preferences of various users. A "Priority Score" tab 204 can be provided to set/adjust the weight for the attributes of an item (e.g., attributes such as To, From, signs of urgency) wherein a source window 208 can be provided to display an item (not shown) from the source 120. For example, in the e-mail example above, a user may decide that every e-mail has a "starts with" value of 25 points at 212. If the value of the respective e-mail's "To" attribute is "Just to me", it gets 36 more points at 216 (or other score selectable by user). If the item is from Customer Support (that is, if the value of its "From" attribute is one of the people listed in the "Customer Support" group), then it receives 21 more points at 220 (or other score selectable by user). To change the weight of a value, users can move one or more sliders at 224, which can be positive or negative integers, including 0. At 230, a "Normalize" button can be provided to facilitate that a total weight of an item does not exceed 100 (or other normalized value).

The adjusted values (described above and below) can be represented, stored, and transported (e.g., via XML or other type file) to an automated learning system such as a notification or communications manager to influence learning processes within the respective systems when directing items to the user. It is noted that the attributes listed for an item for display and modification represent a subset of underlying microstructure that is operated upon by the automated learning systems described above. For example, in one case, an item may represent a microstructure having 10 attributes and in another 27 attributes, wherein the respective attributes represent portions of learning processes that are being applied to the respective item (e.g., one or more classifiers or decision-theoretic routines configured for/operating upon an attribute of an item).

Figure 5:
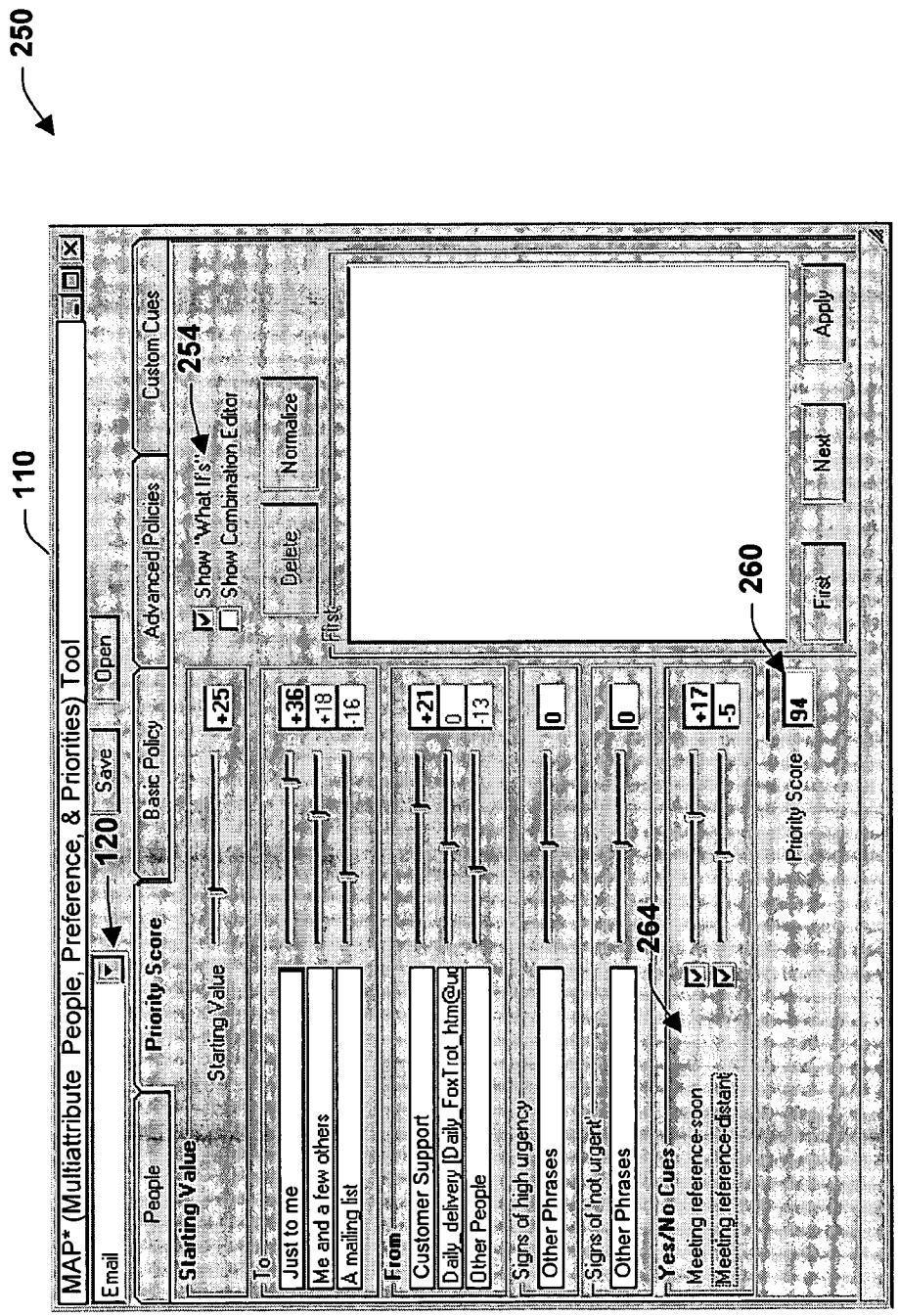
FIG. 5 is a diagram illustrating potential priority scoring in accordance with an aspect of the present invention.

FIG. 5 is a diagram 250 illustrating potential priority scoring in accordance with an aspect of the present invention. By selecting a "What If's" check box at 254, users can test possible values from an item and observe what the item's score may be. In the following example at 250, a potential e-mail item from 120 may be scored with a Priority score of 94 (illustrated at reference numeral 260), wherein 94 relates to if all e-mails receive a starting value of 25, the e-mail is "Just to me" thus, having value of 36 applied, the e-mail is from customer support having a value of 21 applied, a meeting reference is detected as soon having a value of 17, and a distant meeting reference is detected having a value of negative 5. To change the attribute value under consideration and/or combination of values that may be scored, users can mouse-click on other values defined under respective attributes. It is noted that some attributes, called "Cues," have possible values of "Yes" or "No". These are grouped together in a frame labeled "Yes/No Cues" at 264. The value of a Cue ("Yes" or "No") is depicted with an associated check box. The weight of a Cue is the weight for the "Yes" value, whereby the "No" value has a weight of 0.

Figure 6:
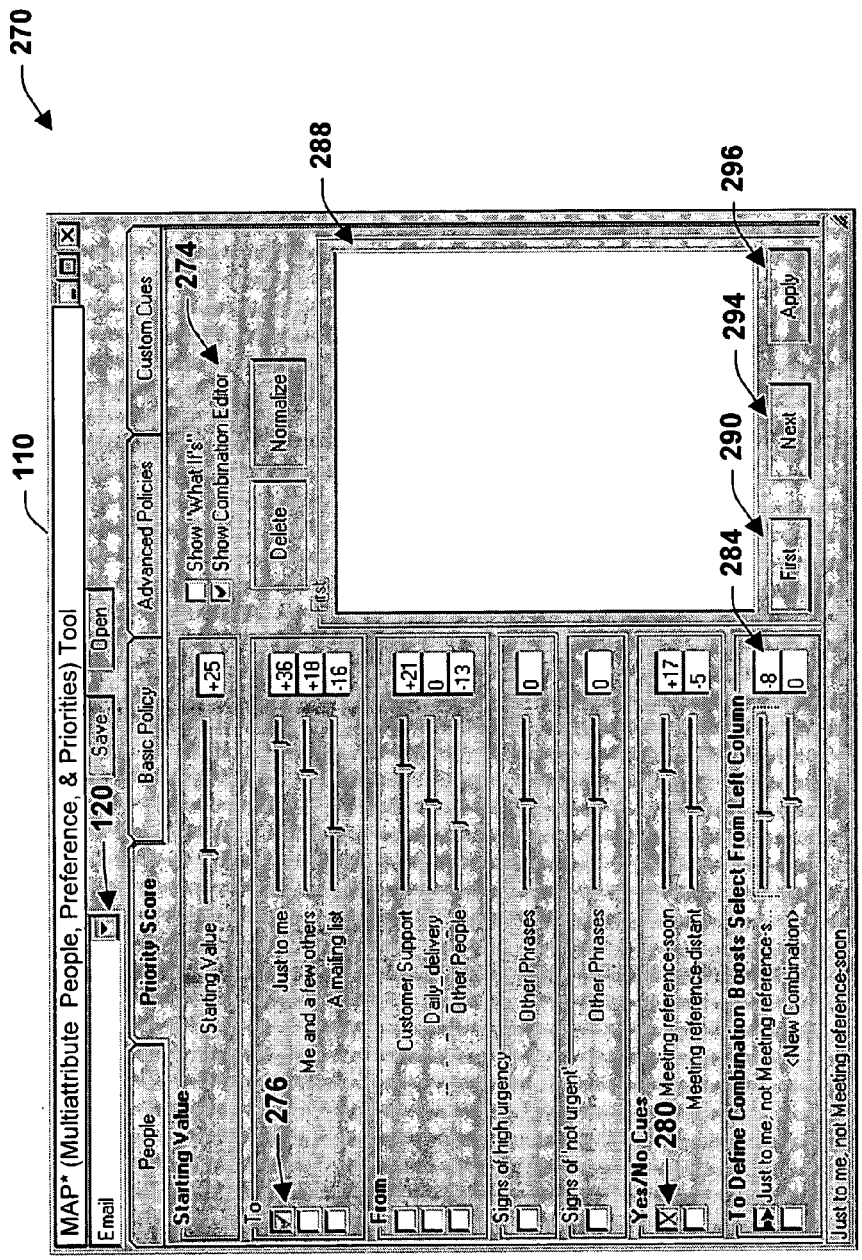
FIG. 6 is a diagram illustrating a combination editor in accordance with an aspect of the present invention.

FIG. 6 is a diagram 270 illustrating a combination editor in accordance with an aspect of the present invention. By selecting a "Show Combination Editor" checkbox at 274, users can define new/different "Yes/No" attributes in terms of other attributes. These new attributes are referred to as "Combination Boosts" because they boost (or diminish) a regular score of an item. In an example below, a user has defined a Combination Boost that will have value "Yes" when:

A "To" attribute has a value "Just To Me", selected at 276 and

A "Meeting reference-soon" has value "No" indicated at 280. In this example, the user has assigned a new attribute a value of "−8" indicated at 284. Thus, an e-mail that is "Just To Me" will get +36 points, but if it does not reference a near-in-time meeting, it will then lose 8 points. As noted above, various combinations of attributes having different values may be employed. It is noted that a window or pane at 288 can be provided. The window at 288 enables users to observe actual items (e.g., drag-in e-mail, text-encoded voice message) and interactively see and edit an associated score. A first button 290 can select a first item from a source 120 such as the most recent or the oldest e-mail from a folder of e-mails. A next button 294 can sequence to the next item in the folder. An apply button 296 can be employed to record or register user adjustments applied to items appearing in the pane 280 via a user preferences file (not shown).

Figure 7:
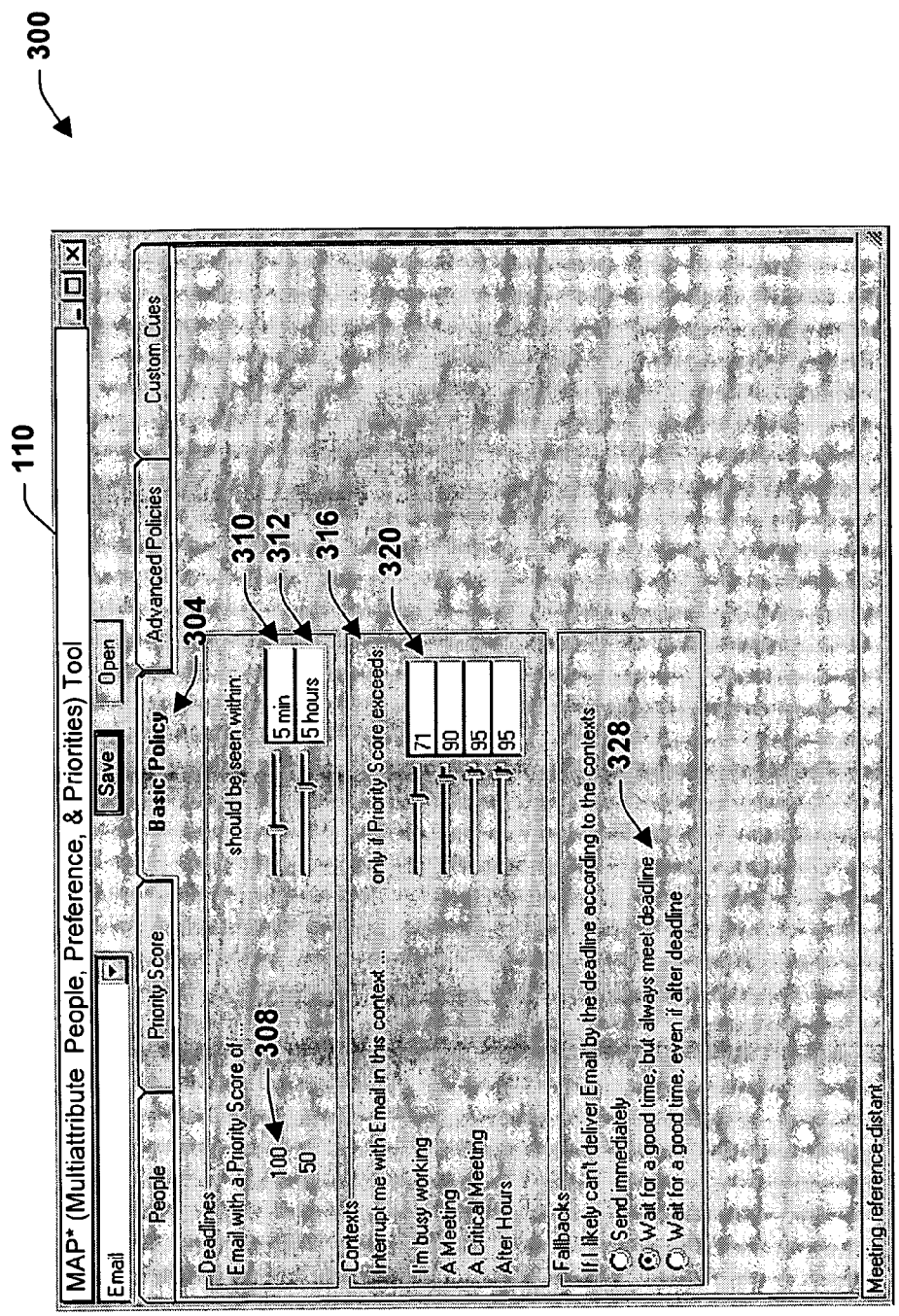
FIG. 7 is a diagram illustrating basic policy adjustments in accordance with an aspect of the present invention.

FIG. 7 is a diagram 300 illustrating basic policy adjustments in accordance with an aspect of the present invention. In this example, users can set bounds on when to be interrupted with an item. If a basic policy tab 304 is selected, and in one example, a user selects that notification about an item such as an e-mail having a score of 100 (at reference numeral 308) (or other value), the notification of the item should be within 5 minutes as indicated at 310. If the score is 50 (or other value), then notification can be delayed up to 5 hours as indicated at 312. For other scores, the time generally will be interpolated between selected values. The MAP tool 110 and associated notification manager generally attempts to meet the deadline (e.g.,5 hours) without creating an unwanted interruption. In a "Contexts" section at 316, users specify which interruptions are suitable given a context (e.g., I am busy, a meeting, a critical meeting, after hours, and so forth). In the example above, it's appropriate to interrupt users when they are busy working if a Priority Score exceeds a settable threshold of 71 (or other value) as indicated at 320. If the deadline can't be met without an unwanted interruption, a "Fallbacks" section 324 is provided indicating what to do in such a situation. In the example above, a selection 328 causes the system to wait for the user's context to change, but if necessary to interrupt at the deadline.

Figure 8:
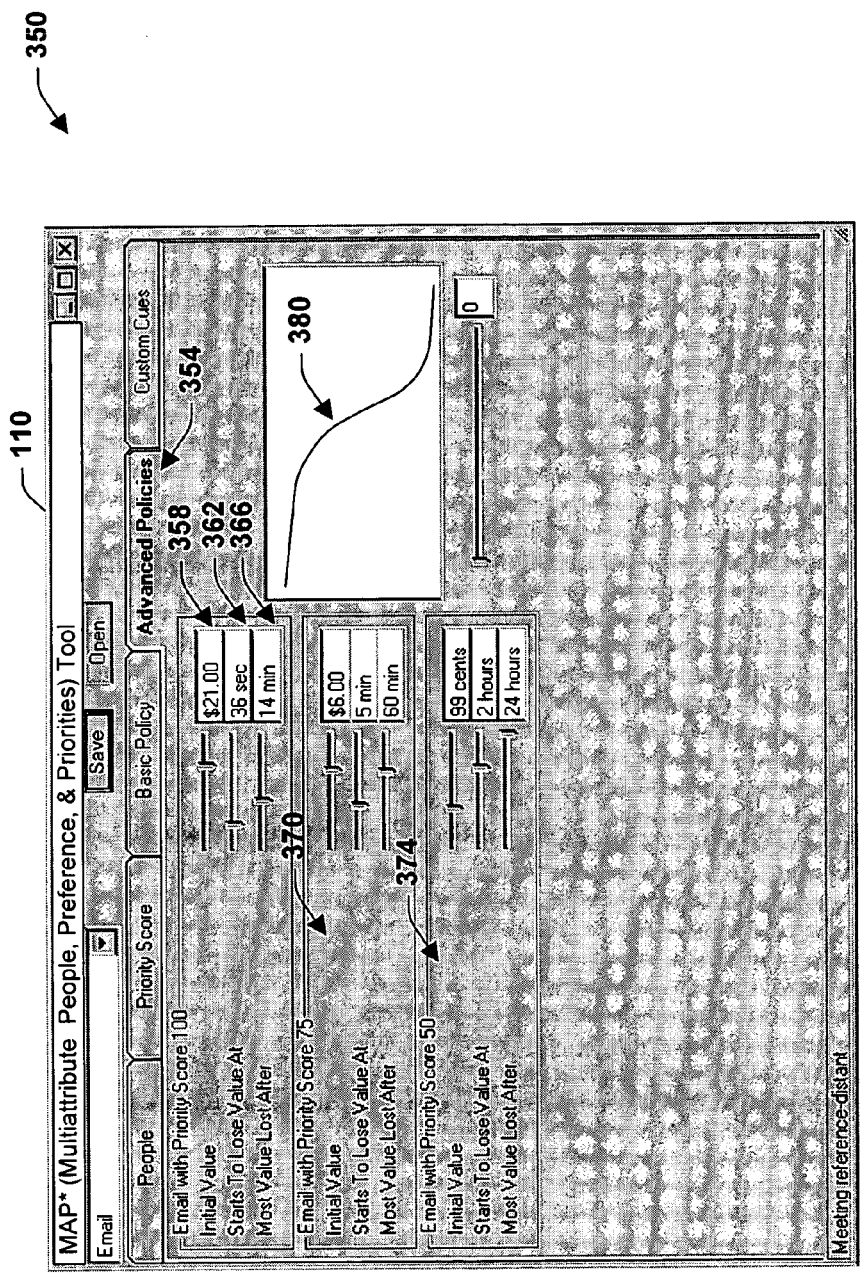
FIG. 8 is a diagram illustrating advanced policy adjustments in accordance with an aspect of the present invention.

FIG. 8 is a diagram 350 illustrating advanced policy adjustments in accordance with an aspect of the present invention. An "Advanced Policy" tab 354 offers an alternate manner in which to specify when users should be notified of an incoming item. This can be achieved by setting an initial value of an item at (e.g., items scored with 100 points) as indicated at 358. In addition, how long before the item starts to loose value (by not being reviewed over time) and when it will have lost most of its value is specified at 362 and 366, respectively, wherein users can specify other values for items scored with 75 and 50 points at 370 and 374, respectively (100, 75, and 50 are exemplary scores). These values are employed to compute the value of an item and how much value will be lost if a notification of the item is not received in time (e.g., a message or item saying "Call me this evening or forget it," may have little or no value if the message is not reviewed until the next day). At 380, a curve or other function such as a sigmoid can be provided to provide some graphical indication of how a respective item looses its value over time if the information or content therein is not reviewed (or review is delayed) by the user (can also include audio/video/text indications such as computer generated message "You better review this message within one hour or its value will decrease to about 0").

Figure 9:
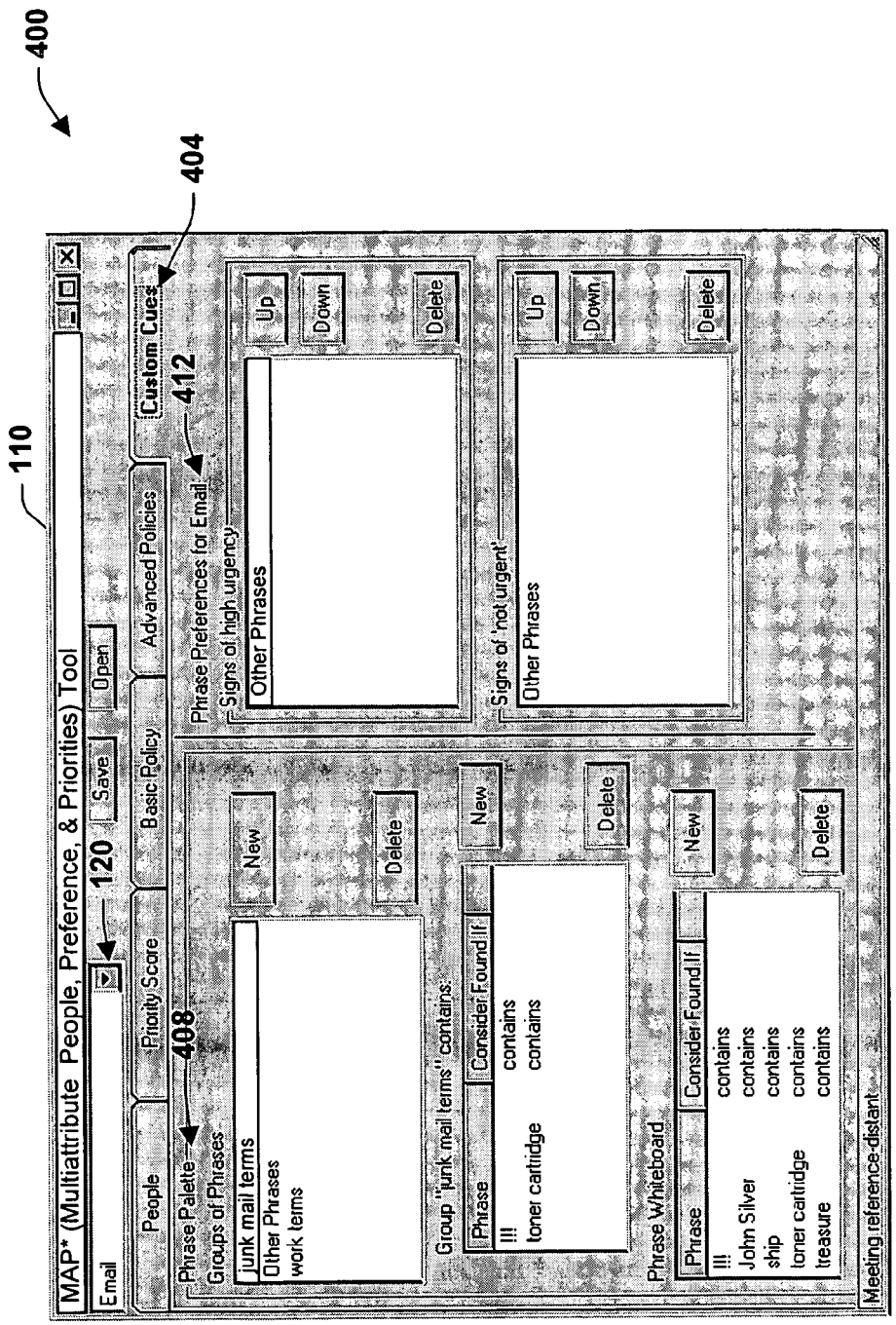
FIG. 9 is a diagram illustrating cues options in accordance with an aspect of the present invention.

FIG. 9 is a diagram 400 illustrating cues options in accordance with an aspect of the present invention. Some attributes of items are determined by looking for phrases in that item. For example, given an e-mail attribute, a "Signs of high urgency" classifier may search for phrases in the subject and/or body of an e-mail (e.g., "I need to speak to you, " "It is urgent," "An emergency"). A "Custom Cues" tab 404 can be employed to specify such phrases or other phrases having lower or higher indications of urgency. The "Custom Cues" tab 404 is somewhat analogous to the address book described above. A Phrase Palette 408 enables users to specify phrases and/or groups of phrases. The phrase can be shared among all sources 120 (or subset of sources), if desired. A list of the attributes of the current source 120 that have phrases and groups of phrases as values can be provided at 412. Users can drop and drag (or copy and paste) to manipulate phrases, groups, and/or attributes, if desired.

Figure 10:
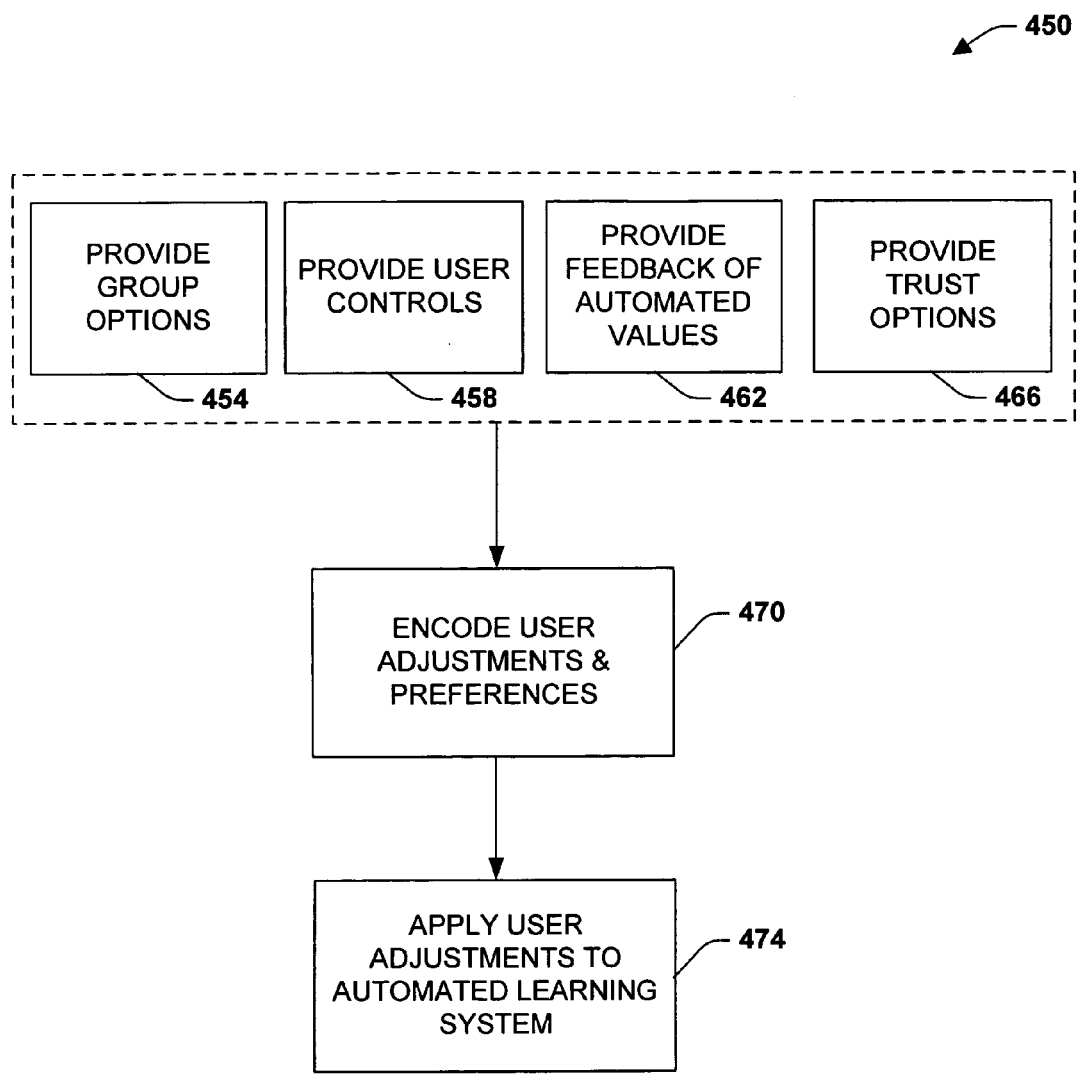
FIG. 10 is a flow diagram illustrating a methodology to facilitate multi-attribute specifications of preferences in accordance with an aspect of the present invention.

FIG. 10 illustrates a methodology 450 to facilitate multi-attribute specifications, control and adjustments in accordance with the present invention. While, for purposes of simplicity of explanation, the methodology may be shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to 454, one or more group options are provided in accordance with the present invention. As noted above this can include defining static groups, dynamic groups and other type groups such as defining a relationship within an organizational structure. Other groups or groupings can include groupings by communications history, past associations, frequency of contact, by meetings and appointments, and/or by projects and/or other association (e.g., members of a club). At 458, one or more user controls or adjustments are provided in accordance with the controls previously described that include such aspects as urgency/priority controls, policy controls, privacy, authorization and/or routing controls which are described in more detail below, and can include such controls as threshold settings. At 462, feedback can be provided to indicate current determined values that may be assigned by an automated learning system to attributes of an item. Alternatively, the feedback can indicate how a selected grouping of various attributes relating to a potential item may be scored.

Proceeding to 466, one or more trust, privacy and/or authorization options and/or controls can be provided. According to this aspect of the present invention, policies can be specified, selected and/or adjusted in accordance with privacy, authorization, and access preferences of a user that may influence rights or actions allowed on behalf of third parties or other entities. Beyond a single notion of trust, various types of trust aspects can be specified for controlling communications between a user and other individuals having varying degrees of trust with the user and in different realms of discourse (e.g., home, office, financial, outside contacts). This can include adjusting various trust threshold settings and selections to define the degrees of trust required before selected actions may occur which are described in more detail below in relation to FIGS. 11–15. In general, the MAP tool previously described can be adapted to define groups having an associated trust relationship to the user— including definitions of multiple dimensions of trust. Numerical and/or qualitative specifications can set various thresholds for different types of access to the user and/or to people and/or assets/accounts associated with the user. In additional, conditional confirmations can be required unless a trust threshold exceeds a user selectable value. At 470, user adjustments and settings from 454–466 are encoded into a file (e.g., XML, binary, text file). At 474, the encoded preferences are employed by an automated learning system to direct items such as messages to a user (and/or enable/disable an action based on trust) in accordance with the user's preferences and/or automated processes within the learning system.

Figure 11:
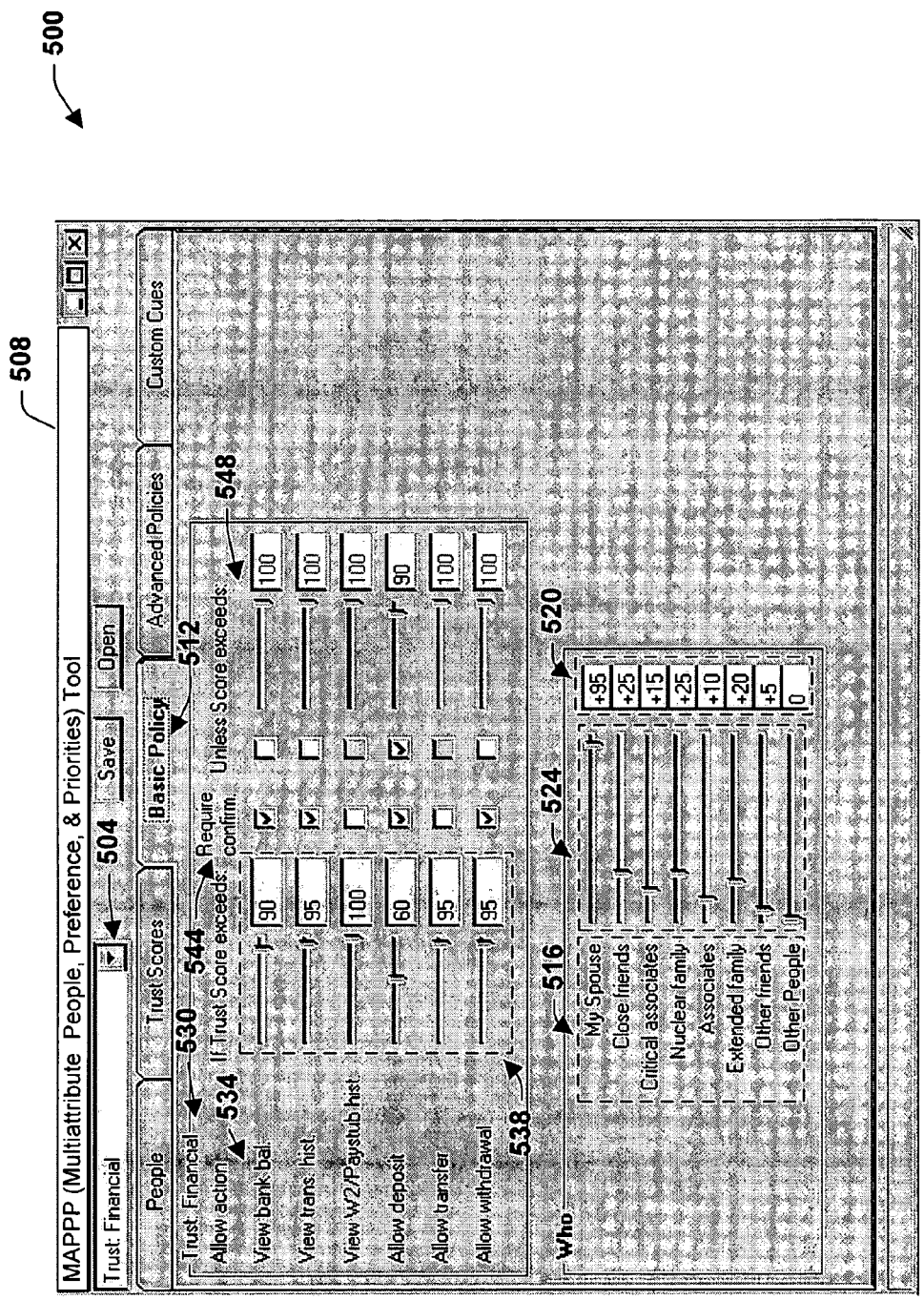
FIGS. 11–15 are diagrams illustrating trust options in accordance with an aspect of the present invention.

FIGS. 11–15 are diagrams illustrating trust options in accordance with an aspect of the present invention. FIG. 11 illustrates a diagram 500 that includes various trust options in accordance with a financial domain or realm, although a plurality of other type domains may be considered. A source option 504 selects a type of trust relationship that can be adjusted in accordance with a MAP tool 508. A basic policy tab 512 can be selected to provide various trust threshold settings and definitions of trusted parties. At 516, a plurality of entities such as people or groups who may be trusted can be defined with varying degrees of trust values at 520. For example, the trusted entities can include my spouse, close friends, critical associates, nuclear family, associates, extended family, and/or other entities if desired, wherein trust values or scores can be adjusted via sliders at 524. A financial pane 530 is provided to adjust trust policies. For example, one or more actions can be defined at 534 such as view a bank balance, view transaction history, view W2 or pay stub history, allow deposit, allow transfer, allow withdrawal and so forth. Threshold adjustments are provided at 538, wherein an associated action is not allowed unless a trust score exceeds a user settable amount or trust threshold. As noted above, trust scores can be associated with various entities at 516–524. For example, if an entity desires to view a user's bank account, they must be trusted with a score greater than 90. In this example, only the user's spouse having a trust value of 95 may be able to perform the desired action. In addition, a require confirmation selection can be further selected at 544 to further limit actions of parties involved in the trust. In this example, since a require confirmation box is checked for viewing a bank balance, even the user's spouse would have to confirm with the user before receiving access to view the bank balance. A further threshold can be adapted at 548 that can set an additional threshold. For example, confirmation may be required by the require confirmation box being selected unless the trust score exceeds a threshold selected and specified at 548.

Figure 12:
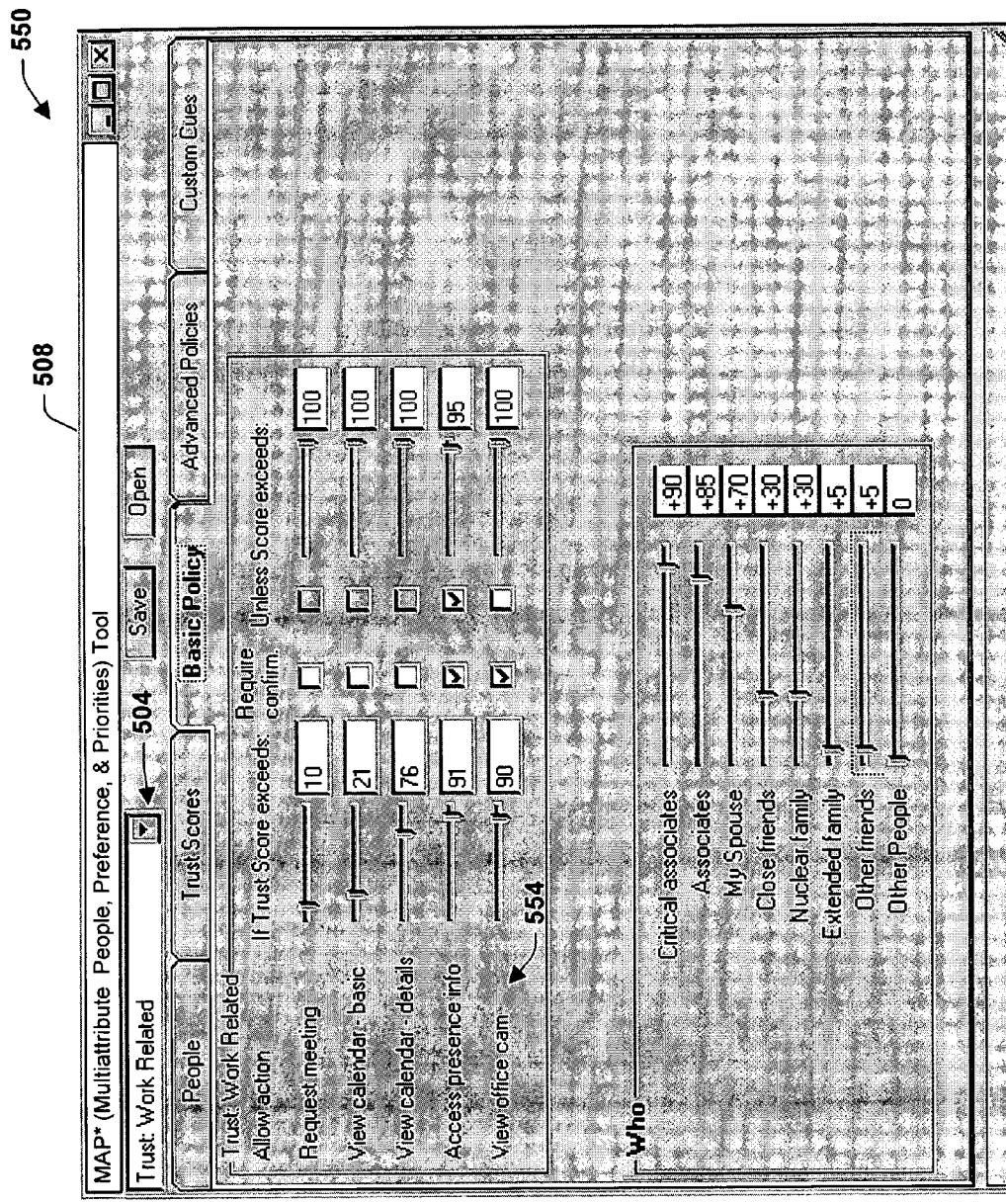
Figure 13:
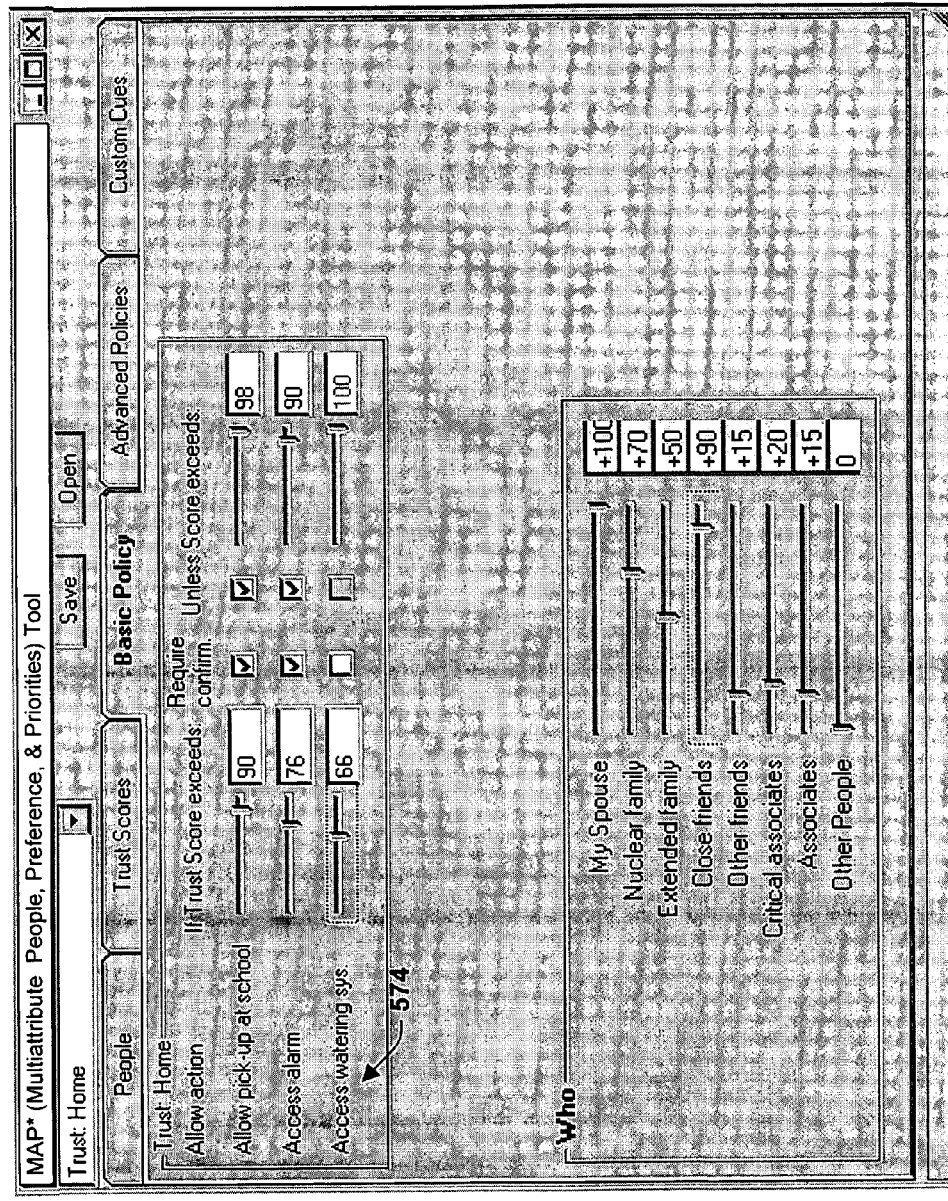

FIG. 12 is a diagram 550 illustrating similar concepts as above, yet adapted for a work trust situation via selection 504. In this example, similar types of entities as described above or other entities may be scored with a trust value, yet different types of actions are allowed at 554 in accordance with work related actions. A plurality of possible third party actions can be defined at 554 such as request meeting, view calendar basic, view calendar details, access presence information, view office camera, access office resources, and so forth. As described above, various threshold settings, adjustments, and confirmation selections can be similarly provided to automatically and/or partially enable or disable such actions by third parties or entities. FIG. 13 illustrates a home trust policy diagram 570. In this example, actions 574 can include such examples such as allow pick-up at school, access alarm, access watering system, access mailbox and so forth.

Figure 14:
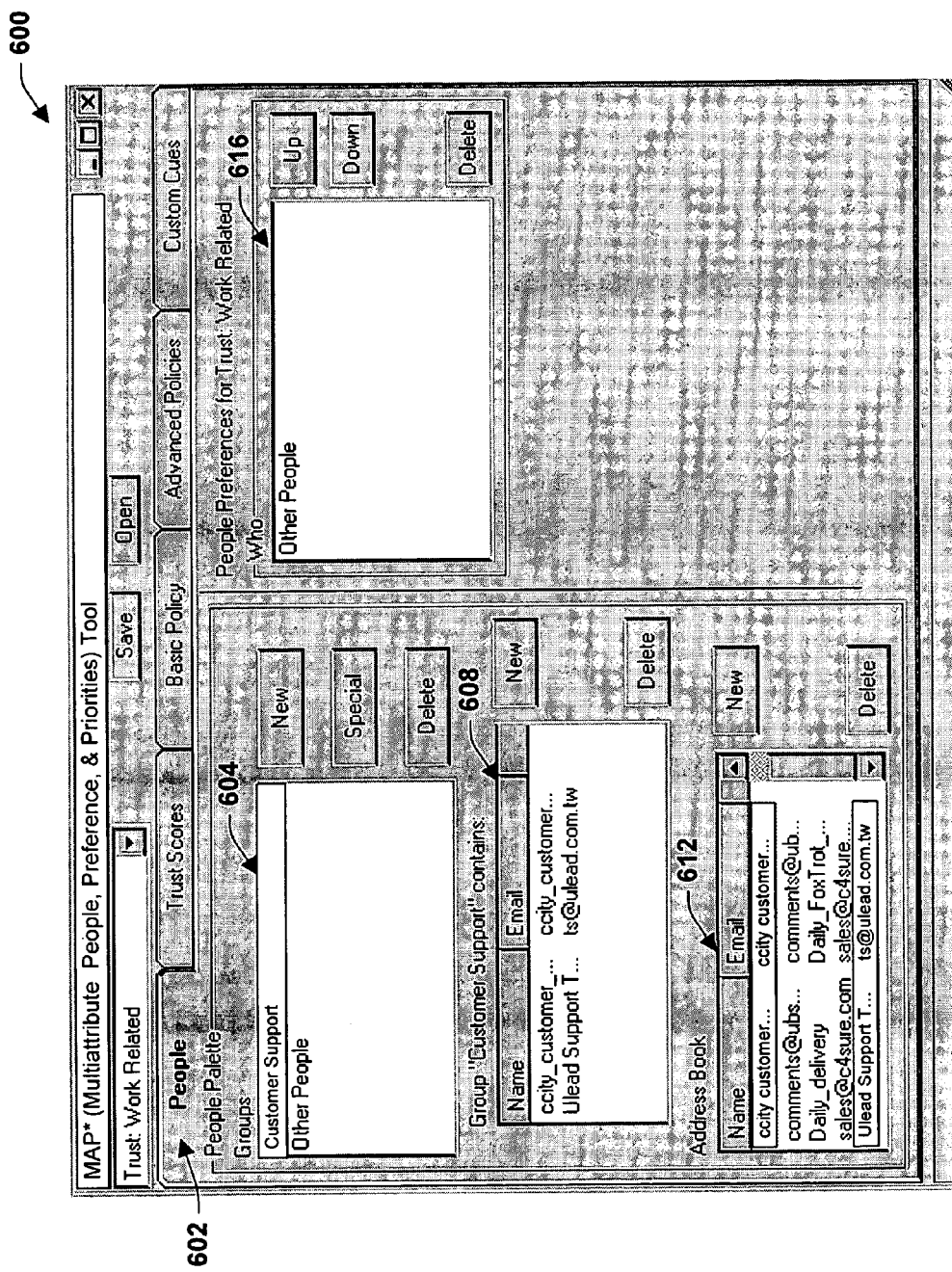
Figure 15:
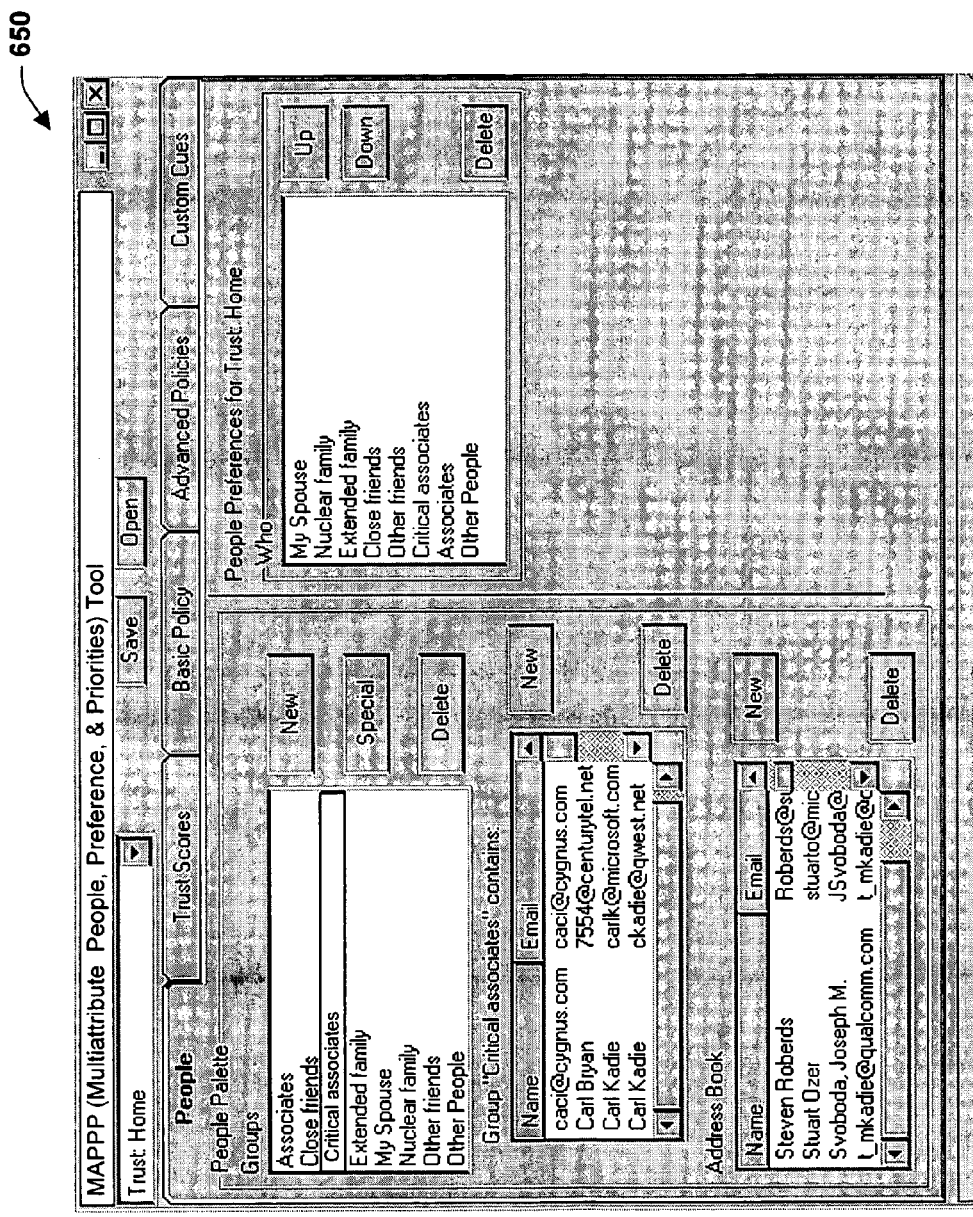

FIG. 14 is a diagram 600 for defining/selecting entities, people, and/or groups of a trust relationship in accordance with the present invention. A people tab 602 may be selected and operated in a similar manner as previously described, wherein various trust groups can be defined at 604 (includes all combinations of static, dynamic, and other type groups previously described). Group members can be defined at 608, and an address book can be provided at 612. A trust preferences pane 616 can be provided to add previously defined trust groups or people to other members of a trust relationship. In this example, work related trust entities are defined, however, it is to be appreciated that other trust relationships can be defined and/or established in accordance with the present invention (e.g., trust relationships based on clubs, associations, churches, temples, other activities and so forth enabling third-party actions similar to above and/or in connection with the associated relationship). FIG. 15 illustrates a diagram 650 to define people and/or groups in a home trust relationship.

Figure 16:
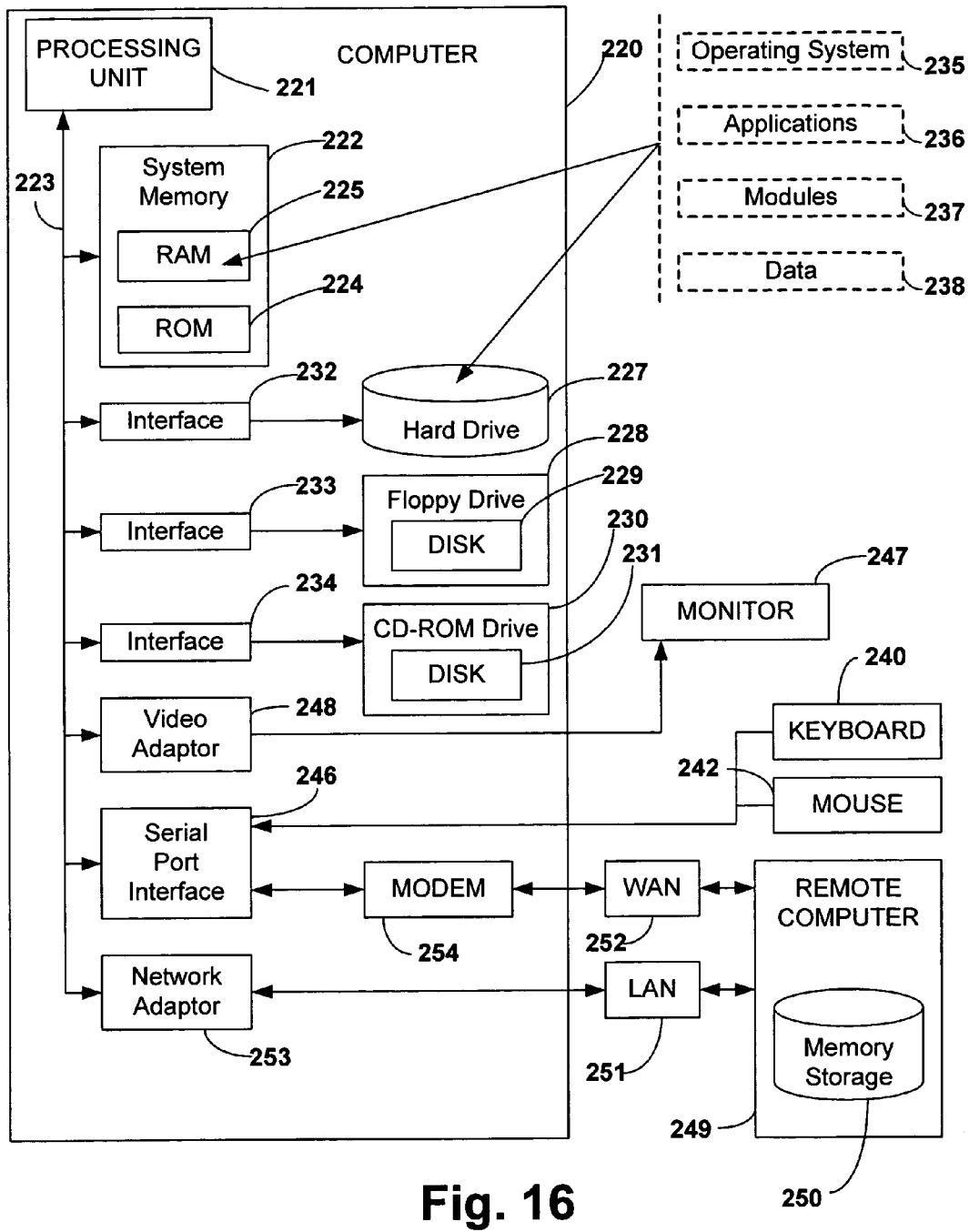
FIG. 16 is a schematic block diagram illustrating a suitable operating environment in accordance with an aspect of the present invention.

In order to provide a context for the various aspects of the invention, FIG. 16 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 16, an exemplary system for implementing the various aspects of the invention includes a computer 720, including a processing unit 721, a system memory 722, and a system bus 723 that couples various system components including the system memory to the processing unit 721. The processing unit 721 may be any of various commercially available processors. It is to be appreciated that dual microprocessors and other multi-processor architectures also may be employed as the processing unit 721.

The system bus may be any of several types of bus structure including a memory bus or memory controller, a peripheral bus, and a local bus using any of a variety of commercially available bus architectures. The system memory may include read only memory (ROM) 724 and random access memory (RAM) 725. A basic input/output system (BIOS), containing the basic routines that help to transfer information between elements within the computer 720, such as during start-up, is stored in ROM 724.

The computer 720 further includes a hard disk drive 727, a magnetic disk drive 728, e.g., to read from or write to a removable disk 729, and an optical disk drive 730, e.g., for reading from or writing to a CD-ROM disk 731 or to read from or write to other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer-readable media provide nonvolatile storage of data, data structures, computer-executable instructions, etc. for the computer 720. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 725, including an operating system 735, one or more application programs 736, other program modules 737, and program data 738. It is noted that the operating system 735 in the illustrated computer may be substantially any suitable operating system.

A user may enter commands and information into the computer 720 through a keyboard 740 and a pointing device, such as a mouse 742. Other input devices (not shown) may include a microphone, a joystick, a game pad, a satellite dish, a scanner, or the like. These and other input devices are often connected to the processing unit 721 through a serial port interface 746 that is coupled to the system bus, but may be connected by other interfaces, such as a parallel port, a game port or a universal serial bus (USB). A monitor 747 or other type of display device is also connected to the system bus 723 via an interface, such as a video adapter 748. In addition to the monitor, computers typically include other peripheral output devices (not shown), such as speakers and printers.

The computer 720 may operate in a networked environment using logical connections to one or more remote computers, such as a remote computer 749. The remote computer 749 may be a workstation, a server computer, a router, a peer device or other common network node, and typically includes many or all of the elements described relative to the computer 720, although only a memory storage device 750 is illustrated in FIG. 16. The logical connections depicted in FIG. 16 may include a local area network (LAN) 751 and a wide area network (WAN) 752. Such networking environments are commonplace in offices, enterprise-wide computer networks, Intranets and the Internet.

When employed in a LAN networking environment, the computer 720 may be connected to the local network 751 through a network interface or adapter 753. When utilized in a WAN networking environment, the computer 720 generally may include a modem 754, and/or is connected to a communications server on the LAN, and/or has other means for establishing communications over the wide area network 752, such as the Internet. The modem 754, which may be internal or external, may be connected to the system bus 723 via the serial port interface 746. In a networked environment, program modules depicted relative to the computer 720, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 720, unless otherwise indicated. Such acts and operations are sometimes referred to as being computer-executed. It will be appreciated that the acts and symbolically represented operations include the manipulation by the processing unit 721 of electrical signals representing data bits which causes a resulting transformation or reduction of the electrical signal representation, and the maintenance of data bits at memory locations in the memory system (including the system memory 722, hard drive 727, floppy disks 729, and CD-ROM 731) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A preference tool for employment with a notification system, comprising:
    a language component to manipulate at least one attribute of at least one item employed by a notification system, the at least one item associated with communications directed to a user; and
    a preference component that receives output from the language component to influence automated learning processes that direct the at least one item to the user via the notification system, wherein the automated learning processes include at least one classifier that analyzes the at least one attribute and automatically determines at least one of urgency and priority of the item, and the classifier employs a feature vector to assign a value to the at least one attribute based upon learning processes applied to training data of the attribute's class.

2. The system of claim 1, the at least one item includes at least one of a message, a notification, a voice message, web information, an e-mail, pager information, an image, an audio file, a video, an alert, and content provided from a web service.

3. The system of claim 1, the classifier further comprises at least one of a Support Vector Machine (SVM), a Naive Bayes model, a Bayes network model, a decision tree model, a similarity-based model, and a vector-based model.

4. The system of claim 1, the automated learning processes employ decision-theoretic analysis to determine at least one of when, where, and if to direct the at least one item to the user.

5. The system of claim 1, the notification system analyzes one or more context inputs to determine the user's present context state in order to direct the at least one item in accordance with a determined urgency of the item and the user's present context.

6. The system of claim 5, the context inputs include evidence of at least one of keyboard activities, mouse movements, microphone inputs, camera inputs, time inputs and electronic calendar information relating to the user's activity.

7. The system of claim 6, where the notification system processes the context inputs to determine at least one of how focused the user is, how busy the user is, what are the user's goals, and whether the user desires to be interrupted with a notification of the item in at least one of the present, at some time in the future, and not at all.

8. The system of claim 1, the language component cooperates with a multiattribute preference (MAP) tool to influence automated decision-making processes in the notification system and according to one or more user preferences specified in the preference component.

9. The system of claim 8, the preference component includes at least one of XML data and a file indicating at least one of desired settings and adjustments of the user.

10. The system of claim 8, the user preferences are derived from the language component via one or more user inputs to at least one of control, adjust, tune and determine the user preferences that potentially alter decision processes in the notification system.

11. The system of claim 8, where message urgencies are determined by multiple prosadic cues identified in a voice encoding of a message, including at least one of rate of speech, energy, pitch average level, and pitch variation, including right and left edge analyses of utterances.

12. The system of claim 8, the MAP tool is operated and presented in a related set of graphical user interfaces (GUI) that interact with a display.

13. The system of claim 12, the display includes one or more display objects that include at least one of a configurable icon, a button, a slider, an input box, a selection option, a menu, and a tab having at least one of multiple configurable dimensions, shapes, colors, text, data and sounds to facilitate operations with the MAP tool.

14. The system of claim 10, the user inputs include at least one of a mouse, a keyboard, a speech input, a web site, a web service, a browser, a microphone, a camera, and a video input that affect operations of the MAP tool.

15. The system of claim 8, further comprising a feedback component that receives automatically determined values from the notification system representing weights that have been assigned to the at least one attribute.

16. The system of claim 15, the automatically determined values provide indications of the automated learning processes affecting delivery of the at least one item to the user.

17. The system of claim 15, the feedback is provided by the MAP tool to facilitate user preferences associated with at least one of controlling, altering, adjusting, tuning, and personalizing the automated processes within the notification system to desired notification performance.

18. The system of claim 17, the performance includes at least one of adjusting how often items are delivered, when items are delivered, who the items are received from, what security measures should be adopted before receiving an item, adjusting an urgency threshold, adjusting policies for receiving items, and controlling access to resources of the user by entities other than the user.

19. The system of claim 1, the language component facilitates various group definitions related to entities that transmit the at least one item to the user, the groups including at least one of a static group, a dynamic group, and group defining other groups.

20. The system of claim 19, the groups are specified by at least one of a distance and a relationship between a user and other entities.

21. The system of claim 19, the groups are specified by an organizational chart.

22. The system of claim 19, the groups specify at least one of people within an organization, the people including at least one of my peers, the organizational peers including people in other groups, up the organizational chart from me, down the organizational chart from me, within n levels on the organizational chart from me, n being an integer.

23. The system of claim 22, the notification system provides organizational chart information when learning about the urgencies of the at least one item via an analysis of at least one of sender fields, recipient fields, and other attributes of the at least one item.

24. The system of claim 19, the dynamic group enables users to define policies for groups defined by communications history.

25. The system of claim 24, the communications history includes people with whom the user has communicated with over time, people with whom the user initiated a communication with, people who the user communicates with frequently being defined by the user.

26. The system of claim 19, the dynamic group specifies such groups by types of communication, the types including people with whom the user initiated a communication via a selected modality over time, the types defined in part by at least one of analyzing a database of communication interactions and the user.

27. The system of claim 19, the dynamic group is based in part on at least one of meetings, meeting histories, appointments and futures.

28. The system of claim 27, portions of the dynamic group are harvested from online appointment books.

29. The system of claim 19, the dynamic group includes temporal distinctions, the distinctions including at least one of people who the user will be meeting with in the future, people who the user will be meeting with soon, people with whom the user has met recently, people who the user will be meeting with today.

30. The system of claim 19, the dynamic group is joined by another association to form a subsequent group, the joining including at least one of a conjunctive and a disjunctive relationship.

31. The system of claim 19, the group is defined by a project.

32. The system of claim 31, further comprising policies that are defined for inclusion of people within groups by dynamic associations and interactions.

33. The system of claim 31, the interactions include at least one of collaborating on a document and people who have edited a shared document over time.

34. The system of claim 1, the language component enables users to at least one of assign and adjust scalar urgency values to the at least one item.

35. The system of claim 1, the language component defines how at least one of different people, components, and attributes associated with informational content of the at least one item influences at least one of an urgency or priority value assigned to the at least one item.

36. The system of claim 35, the language component further comprising a "what-if" mode to enable users to explore a summary analysis of priority values for a selected set of urgency settings.

37. The system of claim 1, further comprising a message browser that automatically identifies values of selected attributes of messages and, assigns values to the messages, the browser facilitates an inspection of how urgencies are assigned to facilitate a deeper understanding by the user of automated notification processes and for at least one of iterating and refining automated urgency assignments.

38. The system of claim 1, the language component further comprising policy controls to influence at least one of basic and decision-theoretic policies for at least one of routing, alerting, and communications within the notification system.

39. The system of claim 38, the basic policies include a bounded-deferral policy adjustable by user on how long to wait in order to find a suitable time to alert the user about the at least one item.

40. The system of claim 38, the policy controls are based on at least one of the user's context and on a determined priority value associated with an item.

41. The system of claim 38, the policy controls specify curves that can be reasoned about in a decision-theoretic manner by the notification system.

42. The system of claim 1, the language component includes at least one of privacy and authorization controls to at least one of assess and control preferences about thresholds of authorization for at least one of different groups of people and for different dimensions of life.

43. The system of claim 42, the controls include a specification of requirements to have third-parties confirm a desire to access information associated with the user.

44. A computer-readable medium having computer-executable instructions stored thereon to perform at least one of the language component, the preference component, and the automated leaning processes of claim 1.

45. A graphical user interface, comprising:
an interface adapted to communicate with an automated learning system,
the automated learning system includes at least one learning algorithm to analyze at least one attribute in order to automatically determine characteristics such as at least one of an urgency and a priority of the item,
the at least one learning algorithm includes a classifier configured to analyze the at least one attribute of at least one item, and
the classifier employs a feature vector to assign a value to the at least one attribute based upon the learning system applied to training data of the attribute's class, the classifier further comprises at least one of a Support Vector Machine (SVM), a Naive Bayes model, a Bayes network model, a decision tree model, a similarity-based model, and a vector-based model;
at least one output associated with the interface to provide indications of learning processes within the learning system relating to the at least one item; and
at least one input to influence the learning processes based in part on a user's preference for receiving the at least one item.

46. The interface of claim 45, further comprising a source selection that provides a plurality of options to select a source of an item of interest, the source including at least one of an e-mail, an instant messenger, a voice mail, a pager notification, PDA, and a trust source.

47. The interface of claim 45, further comprising options to save a state of an application into a file, the file employed to at least one of record settings of the user, provide default settings of the learning system, and provide current settings of the learning system.

48. The interface of claim 45, further comprising at least one of a people tab and a people palette that can be displayed with an address book that is shared by at least two item sources.

49. The interface of claim 48, including one or more options to specify which people and groups are of interest for a currently selected source.

50. The interface of claim 48, the address book stores at least one name and an electronic address of people and sources of interest.

51. The interface of claim 50, further comprising a new button to add entries into the address book.

52. The interface of claim 50, the address book is employed with at least one of an e-mail service and a calendar service that support at least one of copy, paste, drop, and drag functionality.

53. The interface of claim 48, further comprising a display of preferences for a current source, the display depicting attributes in the current source.

54. The interface of claim 48, further comprising options to at least one of define and display groups including at least one of static and dynamic groups.

55. The interface of claim 54, further comprising drag functionality to associated at least one of people and addresses from the address book to a list of group members.

56. The interface of claim 45, further comprising a priority score selection provided to at least one of set and adjust a weight for at least one attribute of an item.

57. The interface of claim 56, the at least one attribute includes at least one of a to, from, and signs of urgency value.

58. The interface of claim 57, further comprising at least one of a "starts with" value, a "Just to me" value, and a mailing list value.

59. The interface of claim 58, including one or more sliders to change a weight of the value, the value including at least one of positive and negative integers.

60. The interface of claim 58, further comprising a normalize option to facilitate that a total weight of an item does not exceed a predetermined normalized value.

61. The interface of claim 56, further comprising a "What If's" option in order that users can test possible values from an item and observe the item's score.

62. The interface of claim 61, further comprising controls to change at least one of the attribute value under consideration and a combination of values that are scored.

63. The interface of claim 61, further comprising cues options have possible values of Yes or No, the cues option relating to a meeting time.

64. The interface of claim 63, further comprising a combination editor to define new attributes in terms of other attributes.

65. The interface of claim 64, the new attributes at least one of boost and diminish a score of an item.

66. The interface of claim 65, further comprising a display to interactively observe and edit a score of a received item.

67. The interface of claim 45, further comprising a basic policy option to configure at least one of time bounds and priority thresholds relating to when to be interrupted with an item.

68. The interface of claim 67, further comprising a contexts section to specify which interruptions are suitable given a current context, the contexts including at least one of an indication of business, a meeting, a critical meeting, and after hours.

69. The interface of claim 67, further comprising a fallback selection to determine how to deliver the item in case a deadline has occurred.

70. The interface of claim 45, further comprising an advanced policy option that includes at least one of adjustments for an initial value of an item, adjustments for how long before the item starts to loose value, and adjustments for when the item will have lost most of its value.

71. The interface of claim 70, further comprising a graphical indication of how an item looses its value over time if information associated with the item is delayed for review by the user.

72. The interface of claim 45, further comprising a custom cues option to specify at least one of phrases and groups of phrases related to indications of urgency.

73. A method to facilitate communications in an automated notification system, comprising:
providing at least one of group options and controls to a user relating to at least one of how and when items are delivered from an automated notification system;
providing feedback of portions of automated learning processes within the notification system to the user;
encoding user selections relating to the at least one of group options and controls;
analyzing at least one attribute for automatically determining characteristics relating to at least one of an urgency and a priority of the item;
assigning a value to the at least one attribute based upon learning processes applied to training data of the attribute's class; and
applying the user selections to the automated learning processes.

74. The method of claim 73, further comprising at least one of defining static groups, defining dynamic groups, defining groups by a relationship within an organizational structure, defining groups by communications history, defining groups by past associations, defining groups by frequency of contact, defining groups by meetings and appointments, and defining groups by projects.

75. The method of claim 73, the feedback further comprises at least one of indicating current determined values that are assigned by the automated learning processes to attributes of an item and indicating how a selected grouping of various attributes relating to a potential item may be scored.

76. A method to facilitate interactions with an automated notification system, comprising:
providing at least one of trust options and controls to a user;
analyzing at least one attribute for automatically determining characteristics relating to at least one of an urgency and a priority of the item;
assigning a value to the at least one attribute based upon learning processes applied to training data of the attribute's class; and
authorizing at least one action of at least one entity via an automated notification system based in part on the at least one of selected trust options and controls.

77. The method of claim 76, the trust options include policies that are at least one of specified, selected and adjusted in accordance with at least one of privacy, authorization, and access preferences of the user to influence the at least one action authorized on behalf of the at least one entity.

78. The method of claim 76, the trust options further comprise providing at least one of home, work, and financial options.

79. The method of claim 78, the financial options include enabling actions to at least one of view a bank balance, view a transaction history, view a W2, view a pay stub history, allow a deposit, a transfer, and allow a withdrawal.

80. The method of claim 78, the work options include enabling actions to at least one of request a meeting, view a calendar basic, view a calendar details, access presence information, view an office camera, and access office resources.

81. The method of claim 78, the home options include enabling actions to at least one of allow pick-up at school, access an alarm, access a watering system, and access a mailbox.

82. The method of claim 76, the controls further comprise adjusting various trust threshold settings and selections to define one or more degrees of trust required before the at least one action occurs.

83. The method of claim 82, further comprising providing options for conditional confirmations to be required unless a trust threshold exceeds a user selectable value.

84. The method of claim 76, the entities include at least one of a spouse, a close friend, a critical associate, a nuclear family member, an associate, and an extended family member.

85. The method of claim 76, further comprising providing trust group options, for identifying members of a trust relationship, the trust group options include at least one of forming a static group and forming a dynamic group of members having selected degrees of trust.

86. A computer-readable medium having stored thereon a data structure, comprising:
- a first data field containing user preferences relating to multiple attributes of an item;
- a second data field containing a group definition pertaining to the item; and
- a third data field containing urgency and priority data associated with at least one of the item and the attributes, the item is at least one of the following an e-mail, a voice message and pager information.

87. The computer-readable medium of claim 86, further comprising a fourth data field relating to policy information to influence communications of the item.

88. The computer-readable medium of claim 86, further comprising a fourth data field containing priority data associated with at least one of the item and the attributes.

89. The computer-readable medium of claim 86, further comprising a fourth data field containing at least one of trust data and trust threshold data.

90. A tool for employment with a notification system, comprising:
- means for manipulating at least one attribute of at least one item employed by a notification system, the at least one item associated with communications directed to a user; and
- means for influencing automated learning processes that direct the at least one item to the user via the notification system; and
- means for determining characteristics such as at least one of an urgency and a priority of the item, the at least one item is at least one of the following an e-mail, a voice message and pager information.

* * * * *